United States Patent
Kjøsnes et al.

(10) Patent No.: US 12,320,239 B2
(45) Date of Patent: Jun. 3, 2025

(54) INFLOW CONTROL DEVICE

(71) Applicant: Equinor Energy AS, Stavanger (NO)

(72) Inventors: Ivar Kjøsnes, Trondheim (NO); Geir Elseth, Porsgrunn (NO); Martin Halvorsen, Mathopen (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 18/280,128

(22) PCT Filed: Feb. 24, 2022

(86) PCT No.: PCT/NO2022/050051
§ 371 (c)(1),
(2) Date: Sep. 1, 2023

(87) PCT Pub. No.: WO2022/186696
PCT Pub. Date: Sep. 9, 2022

(65) Prior Publication Data
US 2024/0068335 A1    Feb. 29, 2024

(30) Foreign Application Priority Data
Mar. 3, 2021   (GB) ..................... 2103002

(51) Int. Cl.
*E21B 43/12* (2006.01)
*E21B 34/06* (2006.01)
(Continued)

(52) U.S. Cl.
CPC ............ *E21B 43/12* (2013.01); *E21B 34/066* (2013.01); *E21B 34/16* (2013.01); *E21B 43/14* (2013.01); *E21B 2200/02* (2020.05)

(58) Field of Classification Search
CPC ........ E21B 34/066; E21B 43/12; E21B 43/25; E21B 34/16; E21B 43/14; E21B 2200/02; E21B 41/12; E21B 41/25
See application file for complete search history.

(56) References Cited

U.S. PATENT DOCUMENTS 2,983,278 A    5/1961  Heintz
3,651,833 A    3/1972  Piko
(Continued)

FOREIGN PATENT DOCUMENTS

WO    WO 2008/004875 A1    1/2008
WO    WO 2014/051559 A1    4/2014
(Continued)

OTHER PUBLICATIONS

International Search Report, issued in PCT/NO2022/050051, dated May 11, 2022.
(Continued)

*Primary Examiner* — D. Andrews
*Assistant Examiner* — Ronald R Runyan
(74) *Attorney, Agent, or Firm* — Birch, Stewart, Kolasch & Birch, LLP

(57) ABSTRACT

An inflow control device configured to switch between an open and a closed state, includes: an inlet; an outlet; a housing; a first body and second body arranged within the housing. The second body is moveable relative to the first body. In an electrically energised state, the first body is operative to magnetically attract or repel the second body. In the open state, the first and second body are located at respective open positions and define a continuous path with the housing, through which fluid can flow from the inlet to the outlet. In the closed state, the first and second body are located at respective closed positions and are contiguous, thereby blocking the continuous path. The inflow control (Continued)

device is operative to switch between the open and closed states by electrically energising or de-energising the first body.

18 Claims, 14 Drawing Sheets

(51) Int. Cl.
*E21B 34/16* (2006.01)
*E21B 43/14* (2006.01)

(56) References Cited

U.S. PATENT DOCUMENTS

| | | | |
|---|---|---|---|
| 10,626,702 B2 | 4/2020 | Ornelaz et al. | |
| 2004/0035578 A1 | 2/2004 | Ross et al. | |
| 2004/0149435 A1 | 8/2004 | Henderson | |
| 2008/0041580 A1* | 2/2008 | Freyer | E21B 43/12 166/193 |
| 2009/0206290 A1* | 8/2009 | Wygnanski | F16K 31/047 251/129.15 |
| 2011/0255996 A1 | 10/2011 | Wickstead et al. | |
| 2011/0290326 A1 | 12/2011 | Øvland | |
| 2012/0018167 A1 | 1/2012 | Konopczynski et al. | |
| 2013/0020513 A1 | 1/2013 | Matsusaka et al. | |
| 2013/0161547 A1 | 6/2013 | Matsusaka et al. | |
| 2013/0161548 A1 | 6/2013 | Matsusaka et al. | |
| 2013/0192852 A1 | 8/2013 | Mazyar | |
| 2013/0221255 A1 | 8/2013 | Ferguson | |
| 2014/0083684 A1 | 3/2014 | Tips et al. | |
| 2014/0137817 A1 | 5/2014 | Komuro et al. | |
| 2014/0209823 A1 | 7/2014 | Fripp et al. | |
| 2016/0177808 A1 | 6/2016 | Hosokawa | |
| 2017/0092406 A1 | 3/2017 | Chu | |
| 2017/0356274 A1 | 12/2017 | Thompson et al. | |
| 2018/0274331 A1 | 9/2018 | Richards et al. | |
| 2019/0226331 A1 | 7/2019 | Green et al. | |
| 2019/0257439 A1 | 8/2019 | Fuller et al. | |

FOREIGN PATENT DOCUMENTS

| | | | | |
|---|---|---|---|---|
| WO | WO 2014/098883 A1 | 6/2014 | | |
| WO | WO 2015/094274 A1 | 6/2015 | | |
| WO | WO-2018160340 A1 * | 9/2018 | ........... | E21B 17/026 |
| WO | WO 2018/222197 A1 | 12/2018 | | |

OTHER PUBLICATIONS

United Kingdom Combined Search and Examination Report, issued in Priority Application No. 2103002.8, dated Aug. 19, 2021.
Written Opinion of the International Searching Authority, issued in PCT/NO2022/050051, dated May 11, 2022.
Great Britain Office Action dated Apr. 25, 2023 for Application No. GB2103002.8.

* cited by examiner

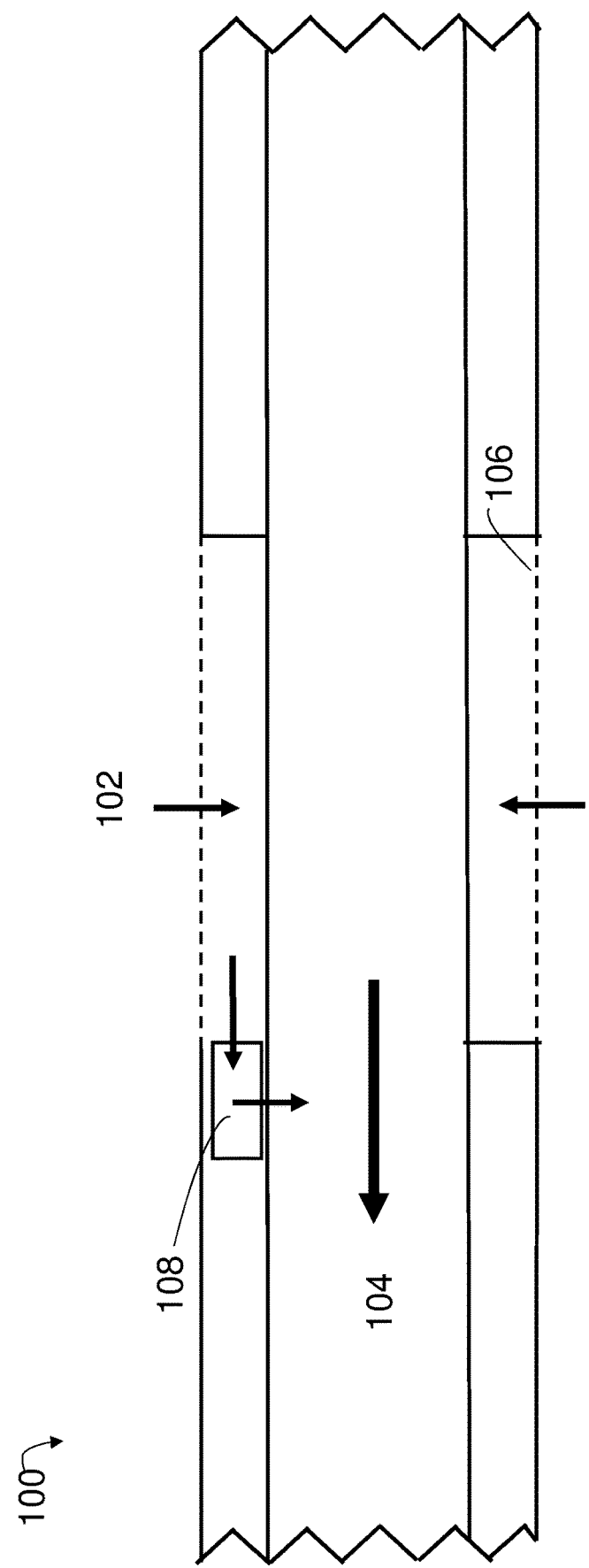

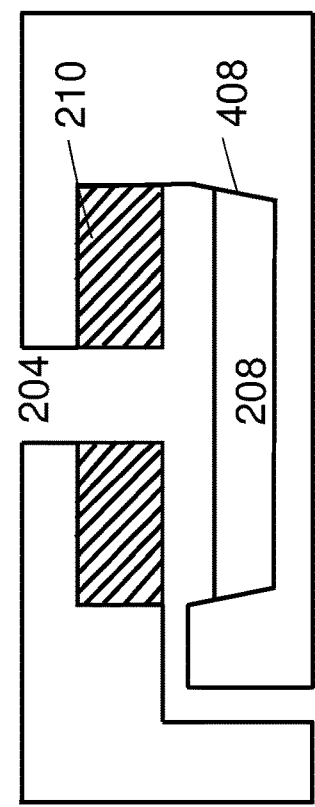
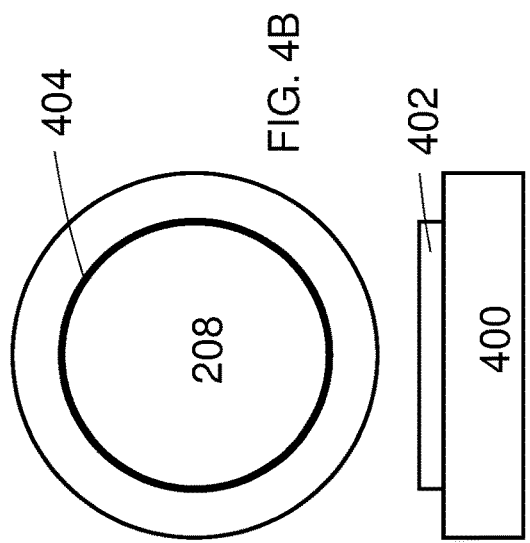
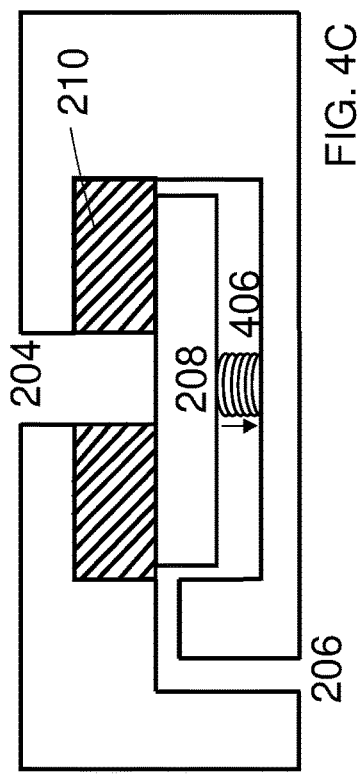
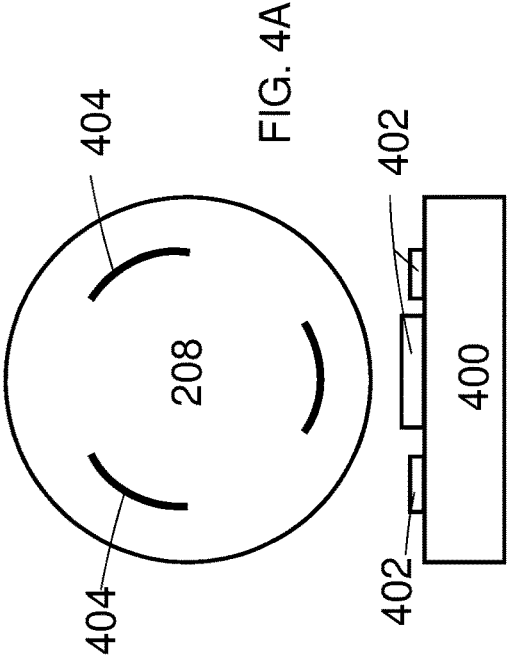

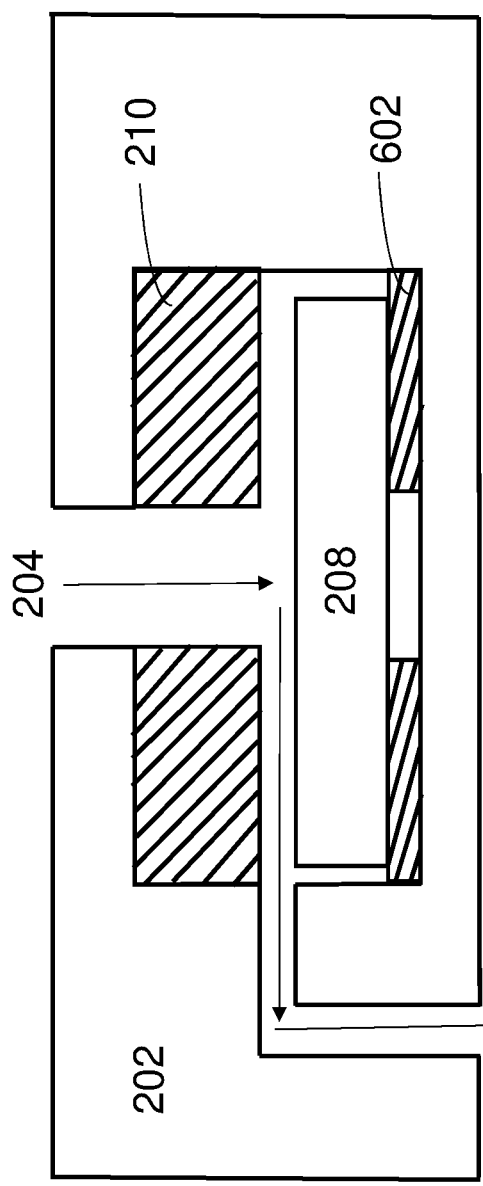
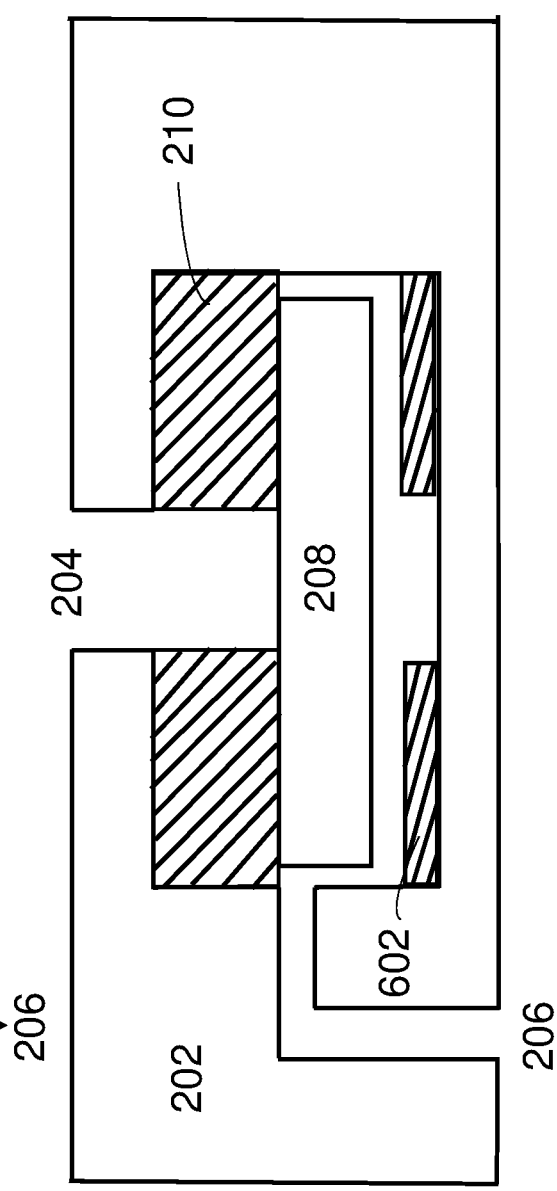

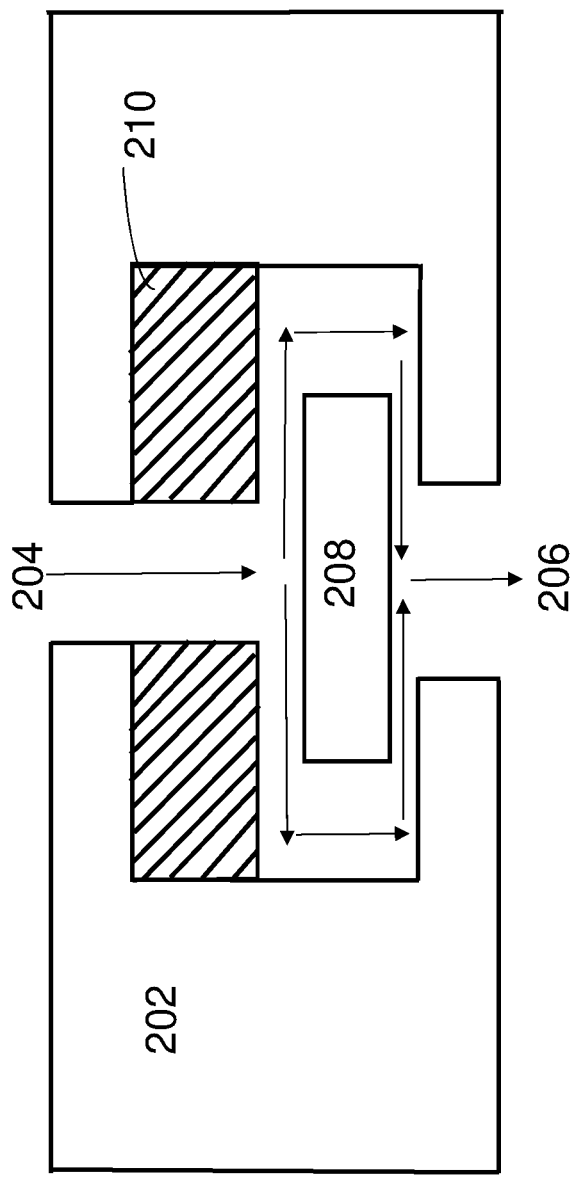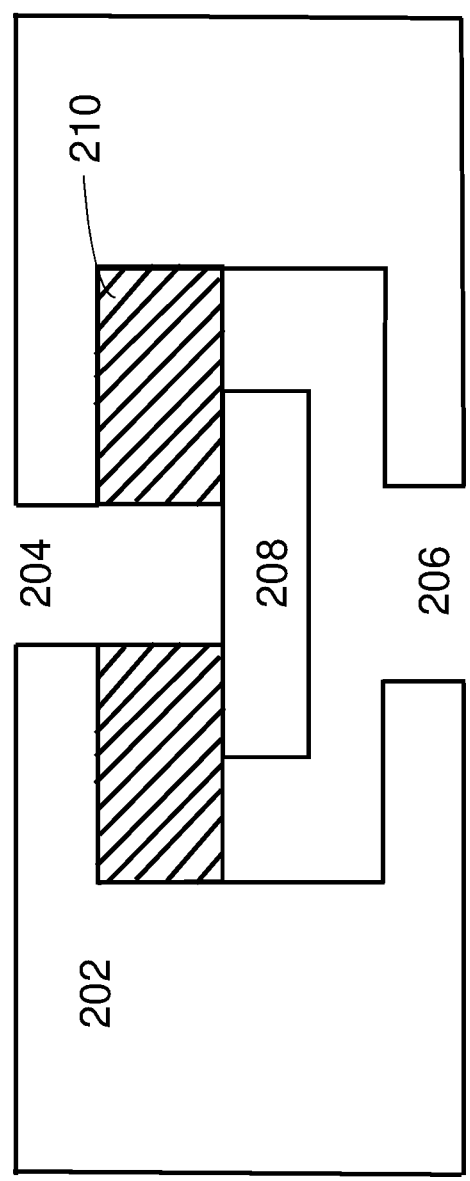

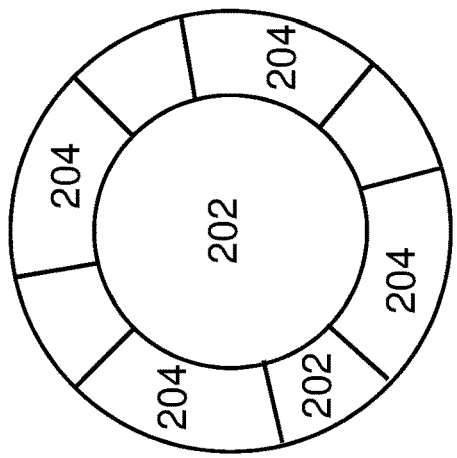
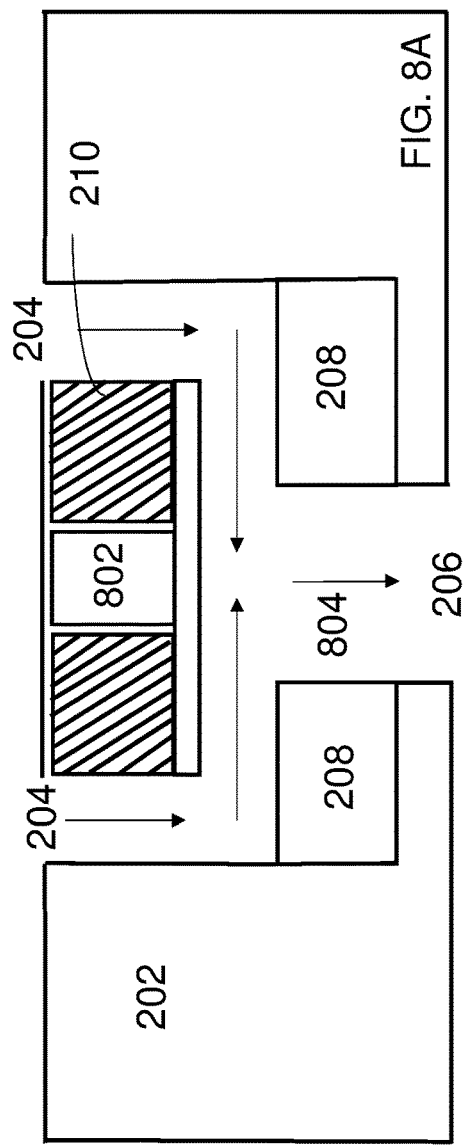
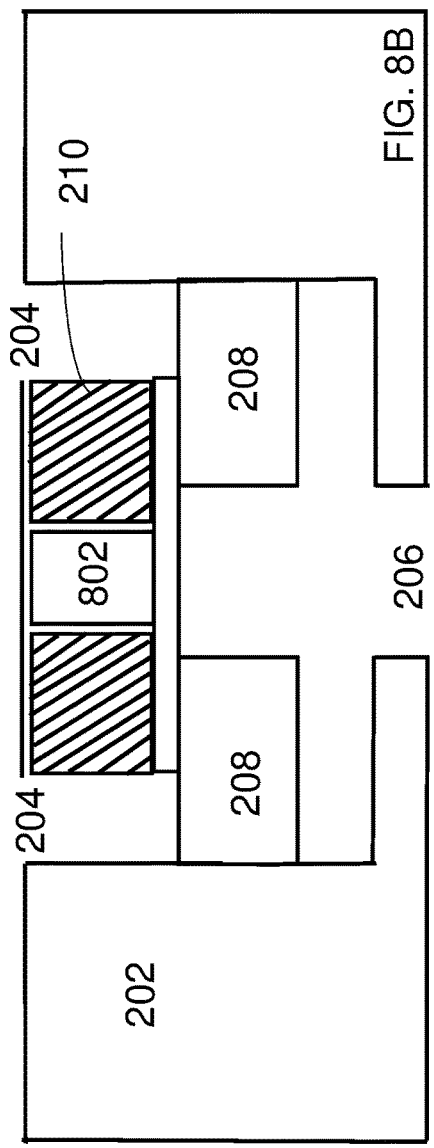

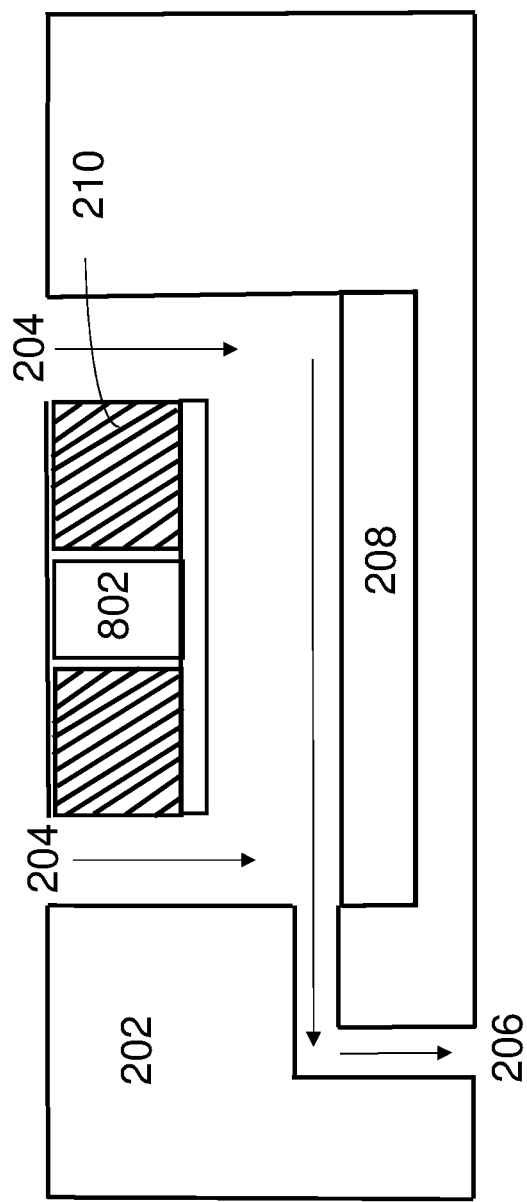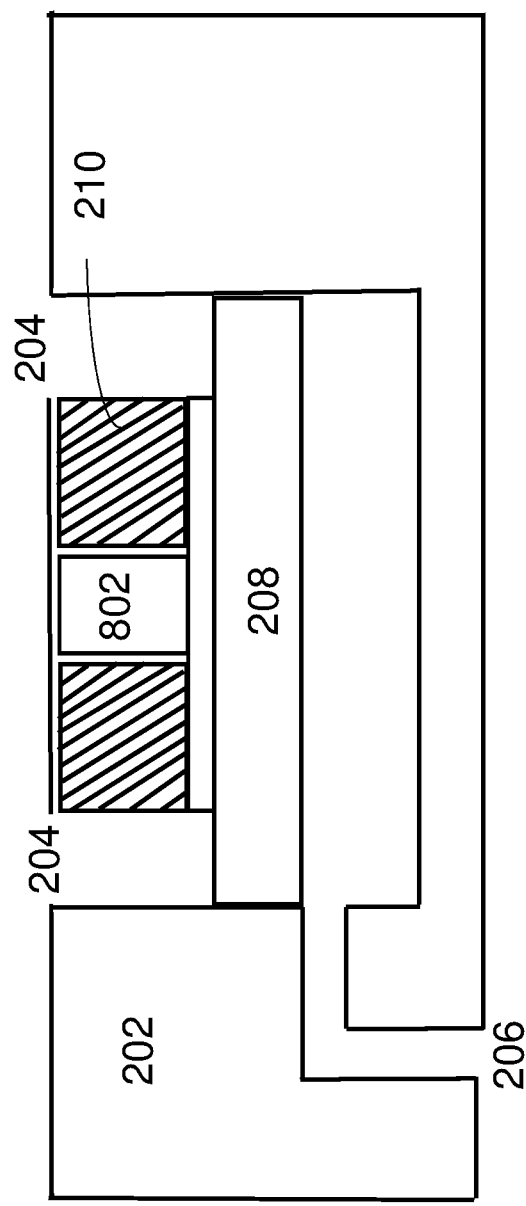

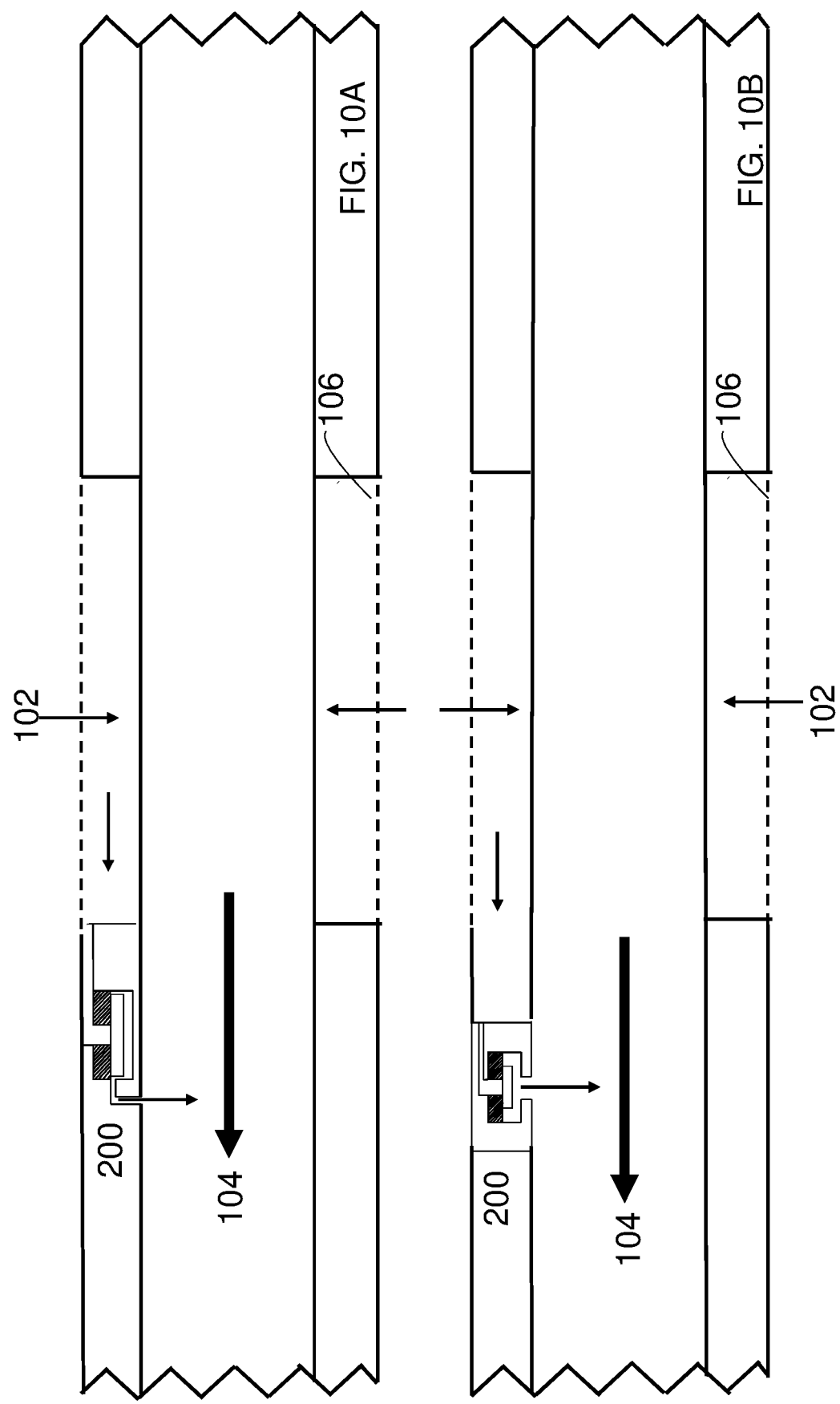

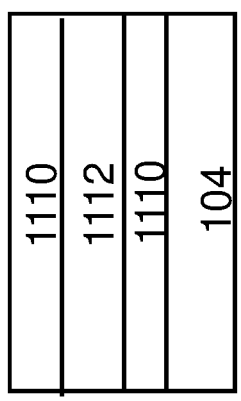
FIG. 11A
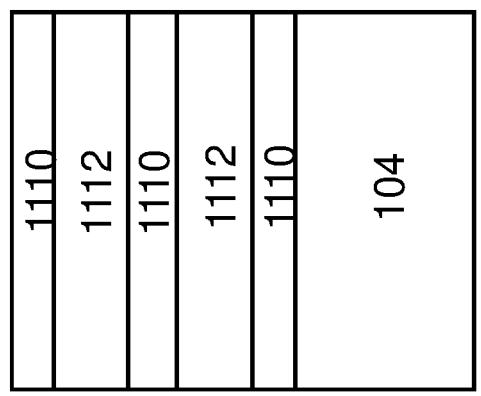
FIG. 11B
FIG. 11C
FIG. 11D

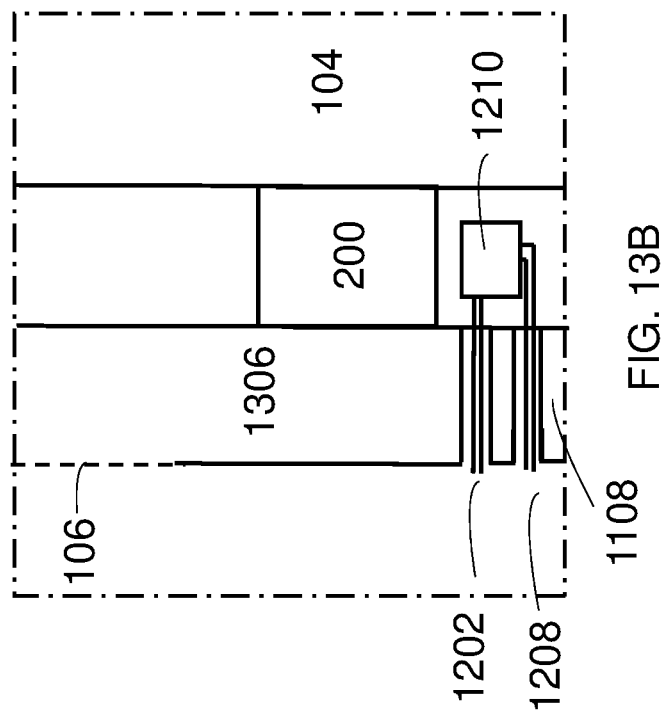
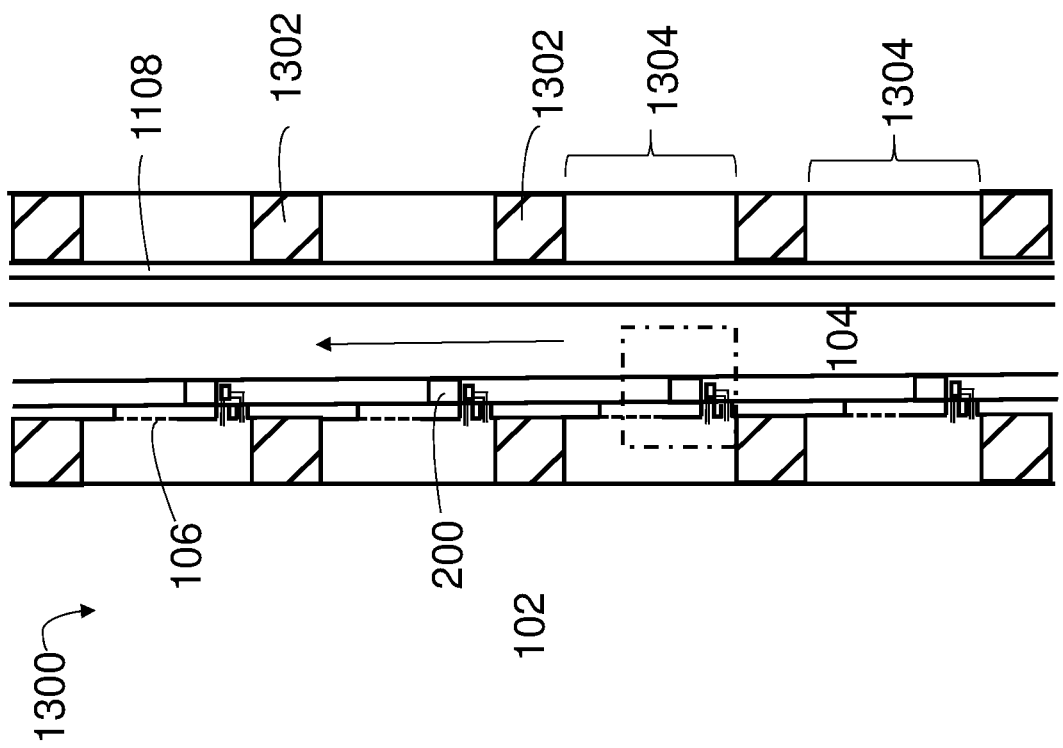

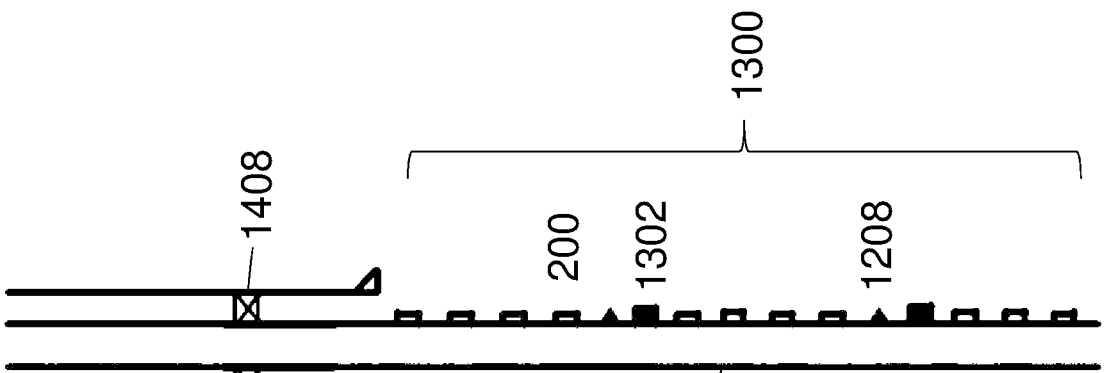
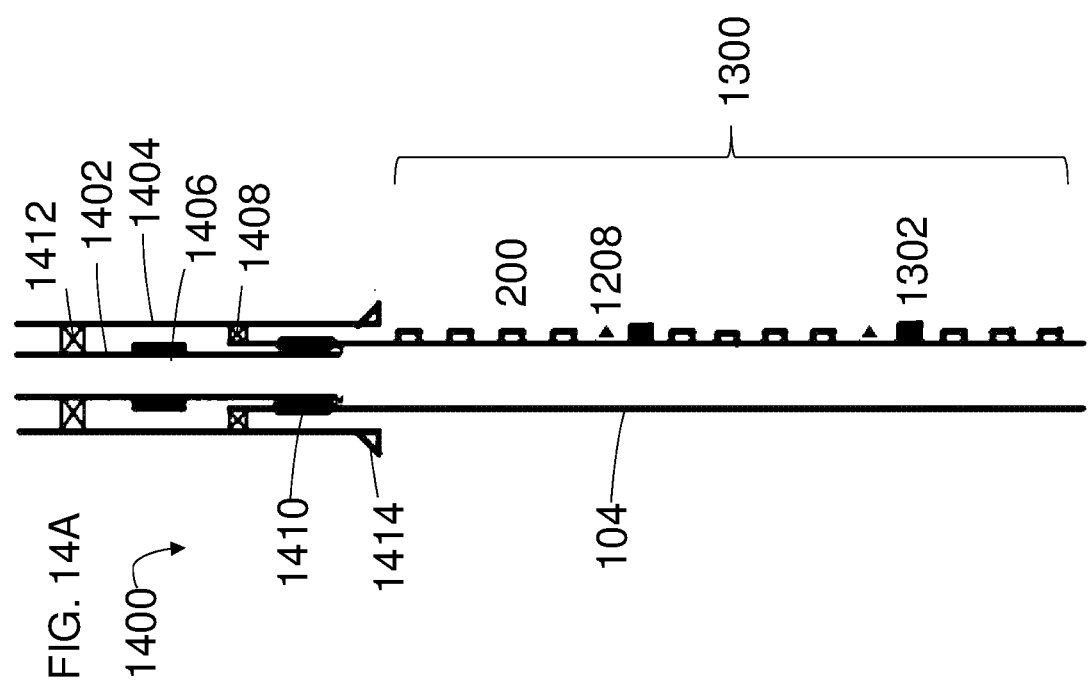

INFLOW CONTROL DEVICE

BACKGROUND

The present invention relates to hydrocarbon production systems, and more specifically to an inflow control device used in a well system, a smart well system, or an advanced well system.

In an effort to improve the production and recovery of oil and gas reservoirs, well completion methods and systems have become increasingly complex over recent years. Conventional vertical wells are being replaced with horizontal and/or multilateral wells with greater well reservoir contact. Whilst such structures can enjoy an improvement in production efficiency, they are also more costly and complicated to drill and install. After installation, variations in reservoir pressure and/or the well-known "heel-toe" effect can cause non-uniform inflow along the well, which can result in early gas and/or water breakthrough. As such, these complicated well structures cannot be efficiently controlled via a surface wellhead choke. Instead, inflow is controlled downhole.

A number of different inflow-restriction systems have been proposed in the background art. These can be categorised broadly into three categories: passive, active and reactive.

In a passive system, inflow control devices (ICD) are used to restrict inflow to differing degrees along a producing interval in a well. ICDs comprise nozzles or channels, which restrict the flow of fluid. The degree of restriction is sometimes known as the ICD "strength". There are various different types of ICD, including nozzle, orifice, helical and labyrinth. The basic working principle is to vary the strength of each ICD along the base string in such a way as to produce a more uniform inflow. The strength of the ICD is set by the geometry and dimension of the fluid channel and is therefore fixed after installation. The resulting system is passive and unable to adapt to dynamic changes. These fluid channels, and therefore the ICDs, cannot be closed.

In a reactive system, autonomous inflow control devices (AICD) or autonomous inflow control valves (AICV) are used, which are able to self-adjust to restrict unwanted fluid flows, depending on the viscosity and density of the reservoir fluid. AICD/AICV-based systems can be designed to reduce/prevent the flow of water and/or gas and increase/allow the flow of oil.

In an active system, the well completion structure is divided into zones using packers and the inflow of each zone is controlled using an inflow control valve (ICV).

SUMMARY

In general terms, a first aspect of the invention proposes an inflow control device for use in a hydrocarbon producing well, the inflow control device is configured to switch between an open and a closed state, the inflow control device comprising: an inlet for fluid entry; an outlet for fluid exit; a housing; a first body and second body arranged within the housing, wherein the second body is moveable relative to the first body, wherein in an electrically energised state, the first body is operative to magnetically attract or repel the second body; wherein, in the open state, the first and second body are located at respective open positions and define a continuous path with the housing, through which fluid can flow from the inlet to the outlet; wherein, in the closed state, the first and second body are located at respective closed positions and are contiguous, thereby blocking said continuous path; and wherein, the inflow control device is operative to switch between the open and closed states by electrically energising or de-energising the first body.

The first body may comprise an electromagnet. For example, a coil of wire and encapsulated in an electrically insulating layer. The second body may comprise a magnet and the magnetic axis of the second body may be parallel with the coil axis. The first body may therefore be operative to magnetically repel the second body. Alternatively, the second body may comprise magnetic material.

The shape of the first and second body may be complimentary such that, when in a closed state, they form a fluid-tight seal. In some examples, the contact surface defined between the first and second body, in the closed state, may be planar.

The first body may define a channel along the coil axis and the continuous path may comprise this channel. The width of the channel is preferably less than the lateral extent of the second body, such that, when the second body is in the closed position, the inflow control device forms a fluid-tight seal. Alternatively, the first body may define an annular channel around the coil axis, wherein the continuous path comprises this channel and the second body is arranged to seal the annular channel in the closed position. In this way, when the second body is in the closed position, the inflow control device also forms a fluid-tight seal. In yet more examples, the second body may comprise one or more apertures and the continuous path may comprises these apertures.

In some examples, the electromagnet may comprise a core disposed within the coil of wire. The core may comprise a soft-magnetic material.

The inflow control device may further comprise a landing arrangement, which is configured to receive the second body in the open position and releasably detach the second body to allow it to transition to the closed position. The landing arrangement may comprise any one or more of: one or more protruding pins, with the second body comprising one or more corresponding recesses configured to receive these in the closed position; and/or a profile, formed in the housing of the inflow control device, wherein the shape of the profile is configured to allow the second body to form a mating connection.

Alternatively, the landing arrangement may comprise a mechanical spring, wherein when the second body is in the closed position, said mechanical spring is under tension, thereby generating a restoring force urging said second body into the open position. In this way, the spring urges the second body into the open position. Or, the landing arrangement may comprise a second electromagnet, which is operative to magnetically attract the second body. Optionally, it may further comprise a mechanical spring, wherein, when the second body is in the closed position, the mechanical spring is under compression. In this way, the mechanical spring continuously urges the second body into the closed position.

The inflow control device may optionally include a nozzle disposed at the outlet and/or inlet.

The inflow control device may be formed integrally into a tubular wall. That is, the housing of the inflow control device is comprised from tubular wall.

According to a second aspect, the present invention provides a smart well divided into one or more zones by one or more packers, each zone comprising: a tubular configured to transport fluid; one or more screens; a connecting channel, defined within the wall of the tubular, configured to transport fluid from each screen to one or more inflow control devices described above, wherein there is pressure communication between the inlet of the inflow control device and the connecting channel and pressure communication between the outlet of the inflow control device and the tubular; one or more electrical conductors configured to transport electrical power into and out of each zone and transport signal into each zone; an electrical circuit coupled to the electrical conductors, wherein the electrical circuit is, at least partially, housed within the tubular walls, the electrical circuit comprising a computer chip; and a control device configured to control the state of each inflow control device, wherein the control device comprises one or more processors configured to generate computer-readable instructions for the corresponding computer chip, wherein, upon receiving the computer-readable instructions, said computer chip is operative to electrically energise or de-energise said inflow control device, thereby controlling its state.

The one or more electrical conductors may be tubular, or as conventional cabling. Both of these forms of electrical conductors may be disposed around, and within the tubular transporting the fluid.

The electrical circuit may be inductively coupled to the electrical conductors, or may be directly connected using wiring.

Preferably, but not necessarily, the electrical circuit comprises one or more electrical devices, which are configured to record data. The data may comprise: a temperature reading, a pressure reading a flow reading, a water content reading and a gas content reading.

Optionally, the computer chip transmits the recorded data via the one or more electrical conductors to the control device.

The control device may analyse the data to determine the state of each inflow control device and the operating conditions of the smart well. The control device may be located at the surface.

Neighbouring zones of the smart well may be joined at opposing ends.

According to a third aspect of the present invention, there is provided a method for controlling the production of a hydrocarbon producing smart well described above, the method comprising: receiving, by a control device, data signals, from one or more electrical devices located in the smart well, of the smart well in a first configurational state, wherein the first configurational state is defined by a configurational state of the inflow control devices; analysing, by the control device, the data signals to determine the state of each inflow control device and the operating conditions of the smart well; determining, by the control device, an updated state of the smart well corresponding to an optimal pressure regime, wherein the updated state of the smart well is defined by an updated configurational state of the inflow control devices; transmitting control signals to the inflow control devices, via electrical conductors, for the inflow control devices to update their state according to the control signal. In the method, the control device may be provided at the surface.

According to a fourth aspect, the present invention provides a method of operating the inflow control device according to the first aspect between an open and a closed state, the method comprising electrically energising or de-energising the first body.

BRIEF DESCRIPTION OF THE FIGURES

Embodiments of the invention will now be described for the sake of example only with reference to the following drawings in which:

FIG. 1 is a schematic illustration of a section of a wellbore.

FIG. 4 is a schematic illustration of landing arrangements of an electronic inflow control device.

FIG. 6 is a schematic illustration of an electronic inflow control device.

FIG. 7 is a schematic illustration of an electronic inflow control device.

FIG. 8 is a schematic illustration of an electronic inflow control device.

FIG. 9 is a schematic illustration of an electronic inflow control device.

FIG. 10 is a schematic illustration of a section of a wellbore.

FIG. 11 is a schematic illustration of electrical cabling in a wellbore.

FIG. 13 is a schematic illustration of a section of a wellbore.

FIG. 14 is a schematic illustration of a section of a wellbore.

DETAILED DESCRIPTION

Figure 2A:
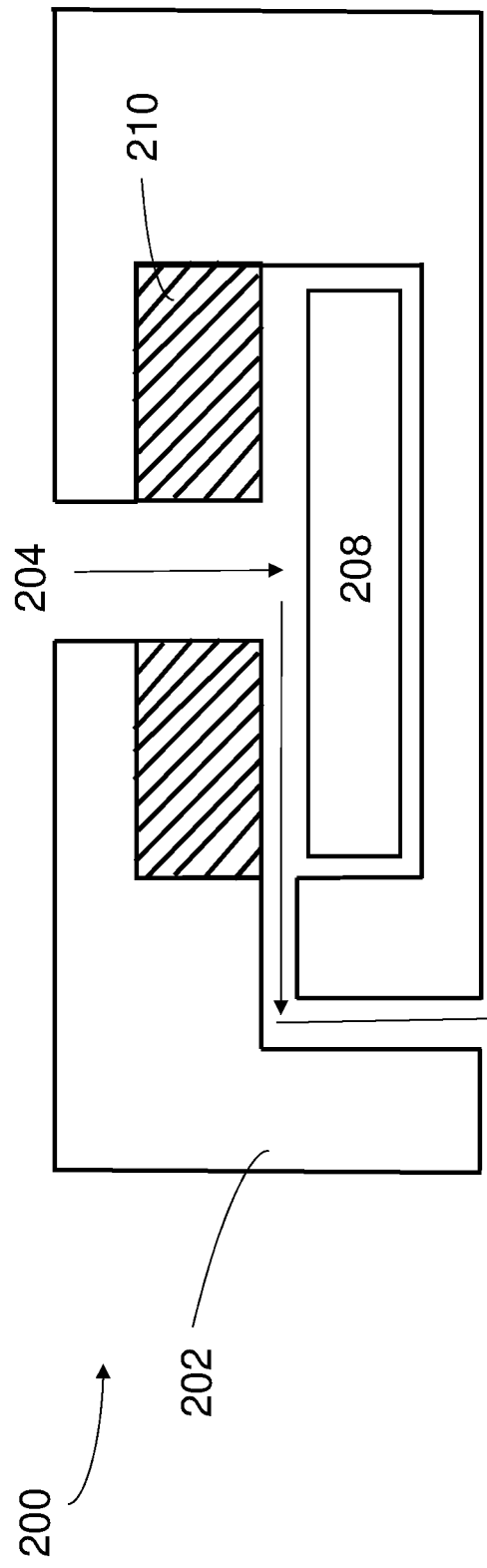
FIG. 2 is a schematic illustration of an electronic inflow control device.

FIG. 1 shows a section 100 of a producing interval of a completed well, disposed within a reservoir 102. A complete producing interval may comprise one or more of these sections 100 joined at each end. In an example, each section may be approximately 12 metres in length and connected to an adjacent section via threaded joints. A typical completed well may comprise 10 to 1000 of these jointed sections 100. Referring back to FIG. 1, the section comprises a base string 104 configured to transport production fluids to the surface, a sand screen 106 configured to block sand-like particulates and one or more inflow control devices (ICVs) 108 configured to control the inflow of fluid from the reservoir. Depending on the geology of the formation, sand screens 106 may or may not required. For example, if sand control is not expected to be a problem, a sand screen 106 may not be used. In this respect, a sand screen 106 can be considered an optional feature. When a sand screen 106 is not used, a coarser filter may be used in its place to protect the inflow control device 108. As would be appreciated by the skilled person, a sand screen 106 is a filter and the aperture size of the screen 106 is in no way limiting. Accordingly, a sand screen 106 may be referred to as a "screen".

When the pressure of the surrounding reservoir is greater than the pressure within the base string, fluid flows from the reservoir through the sand screen and into the one or more ICVs 108 via one or more channels within the base string wall. The arrows in FIG. 1 denote the direction of fluid flow. Each ICV 108 comprises an inlet for fluid entry and an outlet for fluid exit. The ICV 108 either allows fluid to pass (an open state) from the one or more channels into the base string for transportation to the surface, or, prevents fluid inflow (a closed state). During production, the direction of fluid flow is expected to be from the reservoir 102 to the base string 104, but the inventors envisage that the ICVs 108 may also be used for injecting fluid from the base string 104 into the reservoir 102. Therefore, terms such as "inlet" and "outlet" can be viewed interchangeably and are defined by the direction of fluid flow. In the context of this description, unless explicitly stated otherwise, the direction of fluid flow is assumed to be from the reservoir 102 into the base string 104. The completed section of well may be in a horizontal configuration, a deviated configuration or a vertical configuration (relative to the direction of the Earth's gravitational pull). In a deviated configuration, the inclination of the well to the vertical may be between 0 and 90 degrees. The base string 104 may be tubular comprising a longitudinal axis, which defines a first axis, and with a radius, perpendicular to the longitudinal axis, which defines a second axis and a radial direction. As the skilled person would appreciate, the base string 104 may not necessarily be circular in cross-section. For example, the base string may comprise a square cross-section. References herein to "inwardly" and "outwardly" facing are to be interpreted relative to these first and second axes. Explicitly, the surface normal of inwardly facing surfaces points towards the longitudinal axis and the surface normal of outwardly facing surfaces points away from the longitudinal axis. The ICV has dimensions (X, Y). The "width" of the ICV is referred to as the lateral extent, which is the dimension of the ICV along the first axis. The "height" of the ICV is referred to as the radial extent, which is the dimension of the ICV along the second axis. Further references to lateral and radial extent are to be interpreted accordingly. In an embodiment of the present invention, the ICV 108 shown in FIG. 1 is an electronic inflow control device (eICD).

FIG. 2A shows an electronic inflow control device (eICD) 200 in an open state. The eICD 200 comprises a housing 202, an inlet 204 for fluid entry, an outlet 206 for fluid exit, a moveable body 208 and a stationary body 210 operative to generate a magnetic field. The moveable body and the stationary body may also be referred to as a valve and valve seat, respectively. The moveable body 208 and stationary body 210 may be disposed in a chamber (or internal volume) defined by the housing. The stationary body 210 may also be integrally formed with the housing. The stationary body 210 may define a channel in which fluid may pass unimpeded. The moveable body 208 may be a magnetic, more specifically ferro-magnetic disc or plate. The lateral extent of the moveable body is greater than the lateral extent of the channel defined by the stationary body. In this way, the moveable body 208 is able to seal the channel defined by the stationary body 210 and prevent fluid flow through the eICD 200.

In some examples, the minimum size of the eICD 200 may be comparable to the smallest existing AICDs. In these AICDs, the smallest radial extent (i.e., the "height") is around 14 mm and the smallest lateral extent (the "width") is around 33 mm. The eICD 200 may however be smaller than this, as the skilled person would appreciate. The inventors envisage that the minimum inlet size of the eICD 200 may be approximately eight times the screen aperture size. In a typical example, this may be around 2 mm, with a smaller size posing a risk of becoming obstructed in some situations, especially if the opening size is smaller than the aperture size of the sand screen. This minimum inlet size reduces the risk of plugging flow through the eICD 200. In practice, the dimensions of the eICDs 200 may be larger and these values are provided by way of example only.

In the open state, the moveable body 208 is in an open position. In the open position, fluid is able to pass over the outwardly facing surface of the moveable body and into the outlet region. The arrows denote the flow of the fluid through the eICD 200. The arrows are for illustration purposes only and, as noted above, the inlet and outlet can be used interchangeably.

Figure 2B:
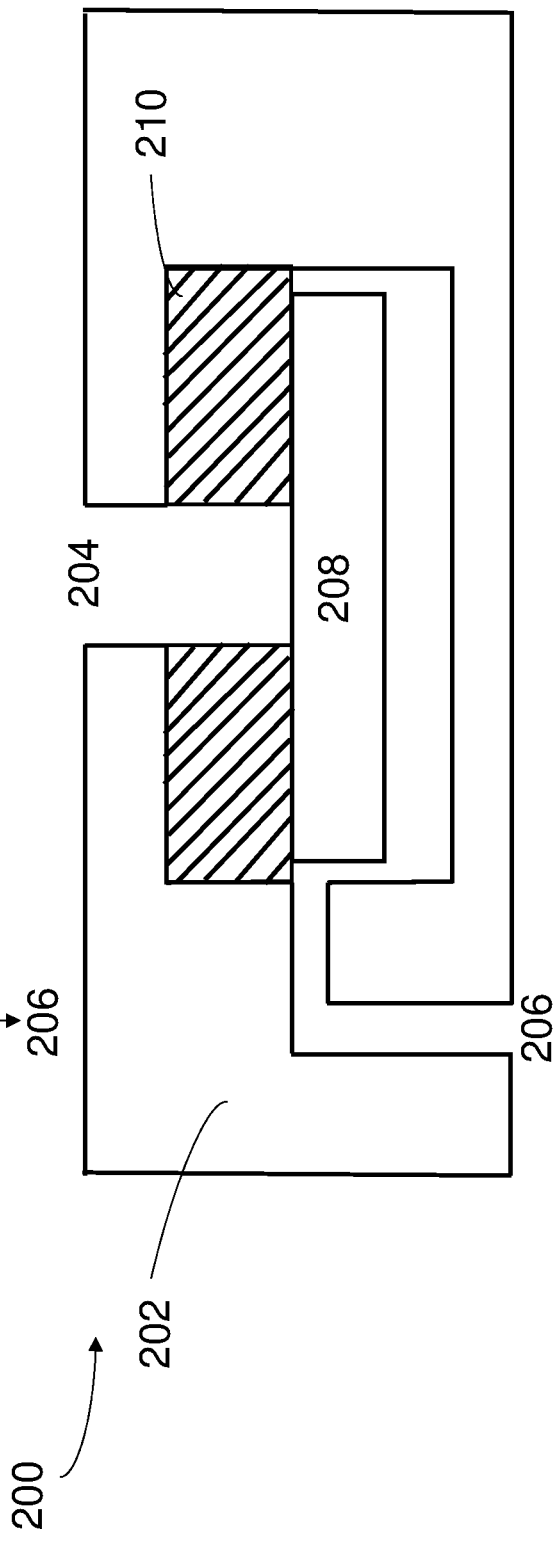

FIG. 2B shows the eICD 200 from FIG. 2A in a closed state. In the closed state, the moveable body 208 is in a closed position. In the closed position, the outwardly facing surface of the moveable body and the inwardly facing surface of the stationary body are in contact, thereby forming a fluid-tight seal.

In FIGS. 2A and B, the inlet is disposed on the "top" radially extending surface of the eICD housing. As the skilled person would appreciate, the general location of the inlet is a design option and the inlet is not limited to this configuration. For example, the inlet may instead be disposed on one of the laterally extending surfaces of the housing 202. In addition, each eICD may comprise one or more inlets and outlets.

The stationary body 210 may comprise a spool or coil of wire surrounded by an electrically insulating layer, which forms an encapsulation. In an example, the spool is toroidal in shape and the hole of the torus surrounds the fluid channel. The spool, when electrically energised, generates a magnetic field. The spool can be energised by passing a direct current through the spool of wire. The stationary body therefore acts as an electromagnet. Herein, stationary body and electromagnet are used interchangeably. The moveable body 208 is magnetisable. That is, in the presence of a magnetic field, a net magnetisation (or magnetic moment per unit volume) is induced within the moveable body 208. Once the moveable body 208 is magnetised, a magnetic attractive force acts between the stationary body 210 and moveable body 208, which urges their respective opposing faces together and the eICD 200 into the closed state. In the example shown, the electrically insulating layer is arranged to form a planar surface on the stationary body such that a fluid-tight seal is formed when in contact with the opposing planar surface of the moveable body.

During operation, the fluid pressure on the inlet-side is greater than the fluid pressure on the outlet-side. When the eICD 200 is in the open state, this pressure difference drives fluid through the eICD. The choking effect of the eICD 200, which in itself results in a pressure drop, ensures that the pressure difference between the inlet and outlet side is maintained under steady state conditions. In principle, during operation, a smaller pressure drop is preferred as this minimises the skin factor and therefore maximises production efficiency. However, in practice, different reservoir zones produce at differing rates due to different rock permeability and porosity and different reservoir zones may also have different water/gas compositions. Therefore, in general, there are imbalances in both quantity of production and quality of production between different reservoir zones. Controlling the pressure drop within a particular reservoir zone is useful for balancing both the quantity and quality of production across these reservoir zones. For example, if one zone is producing too much water or gas, then this zone can be choked (i.e., the eICDs 200 are closed) to reduce production. Equivalently, a zone which is producing too much fluid (regardless of quality) may be choked to slow down fluid inflow. The degree of choking in a reservoir can be controlled by opening and/or closing the eICD 200.

Optionally, a nozzle or other fluid restricting means may be placed at the outlet 206 of the eICD. A nozzle may also be placed at the inlet 204. The fixed nozzle can be used to control the pressure drop generated by fluid passing the eICD 200. The pressure drop being controlled by the shape and size of the nozzle. The pressure drop may also be controlled by the opening or closing of adjacent eICDs.

When the eICD 200 is in a closed state, there is a pressure difference across opposing faces of the moveable body 208.

The outwardly facing surface of the moveable body is under a pressure $P_1$ and the inwardly facing surface of the moveable body is under a pressure $P_2$, where, in general, $P_1$ is greater than $P_2$. The eICD 200 remains in the closed state as long as the attractive magnetic force between the moveable body 208 and the stationary body 210 is larger than the force exerted by this pressure difference. When neglecting any other effects (e.g., weight), the pressure difference across the moveable body 208 is given by the following equation:

$$\Delta P < \frac{A_3}{A_1}(P_2 + 2P_3),$$

Where $\Delta P$ is the pressure difference P1–P2, $A_1$ is the area of the channel defined by the stationary body 210, $A_3$ is the contact area between the stationary body 210 and the moveable body 208, and $P_3$ is the pressure exerted by the electromagnet 210 on the moveable body 208. Therefore, by increasing the ratio of $A_3$ to $A_1$ (or by increasing the contact area between the moveable body 208 and stationary body 210 relative to the fluid channel defined by the stationary body 210), a weaker electromagnet is required (for the same input current). This equation may therefore not hold for the other examples described in further detail below.

The pressure difference also depends on whether the fluid on the inwardly facing side of the moveable body is a liquid or a gas. Referring back to FIG. 1, the fluid on the outlet-side may be the fluid within the base string. These fluids may have been extracted from the reservoir. Such fluids include a mixture of water, oil and/or gas. As each of these phases has a different density, they have a tendency to separate in the base string 204. This is especially true when the base string 204 is oriented in a horizontal fashion with respect to the earth's gravitational pull, in which case the different phases will stratify. In general, the eICD 200 may either be located in a region containing liquid or gas, which in turn, may affect the value of the outlet-side pressure, $P_2$.

However, it is emphasised that the completion structure 100 may be in a vertical or horizontal configuration (relative to the Earth's gravitational pull) and gravity is not required to open or close the eICD 200. In other words, the orientation of the base string and the relative placement of the eICD within the base string are not necessarily essential, but do affect the operating requirements (i.e., the strength of electromagnet required). In addition, the weight of the moveable body 208 may also affect the pressure difference equation above. For example, the weight may reduce the maximum pressure difference (defined when the equation above is an equality) somewhat. Equally, it may increase the maximum pressure difference, depending on the orientation of the completion structure. In general, the lighter the moveable body, the faster the eICD can be switched from the open to closed state (and vice versa). For this reason, preferably the thickness of the moveable body 208 is minimised. Typical thickness values may be 5 mm, more preferably less than 1 mm. During operation, abrasive particles in the fluid passing through the eICD 200 may abrasively erode the moveable body 208. As such, the moveable body 208 may thin over time. To account for this thinning, the thickness of the moveable body may be larger than the total erosion expected across the expected lifetime of the eICD 200. The exact values are dependent on materials selection and the expected operating pressure difference, as the skilled person would appreciate.

Figure 3B:
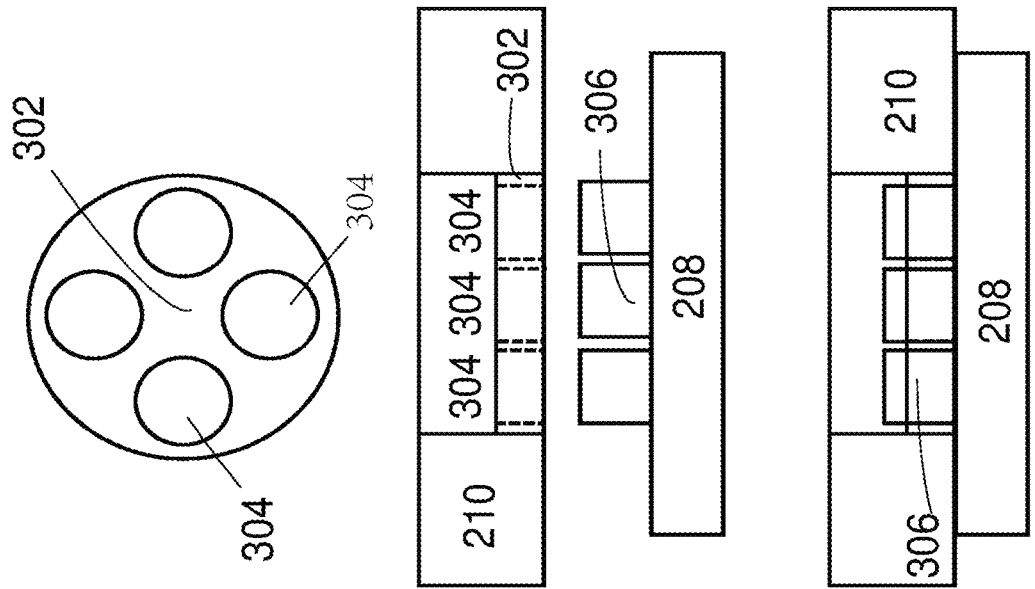
FIG. 3 is a schematic illustration a valve.
Figure 3A:
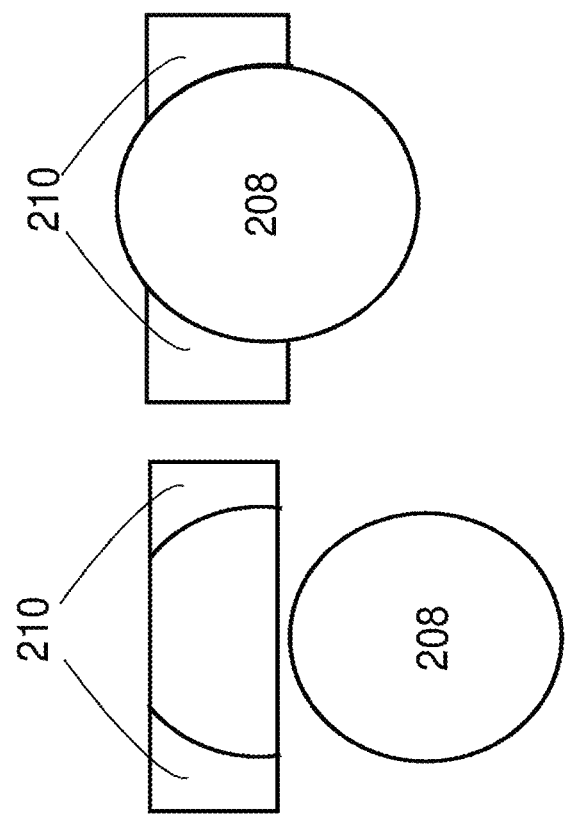

In FIG. 2, the contact surface, which forms the fluid-tight seal, between the moveable body 208 and the stationary body 210 comprises two abutting planar surfaces. As the skilled person would appreciate, there are many possible shapes, which are capable of mutually abutting. For example, the contact surfaces of the moveable body and stationary body may not necessarily be planar. FIGS. 3A and B shows some alternative arrangements. Generally speaking, when the fluid-tight seal is non-planar, the shape of the moveable body and stationary body are complimentary. The shape of the stationary body may be controlled by varying the thickness of the electrically insulating encapsulation spatially around the spool/coil of wire. The shape of the stationary body is therefore not limited to the shape of a spool or coil of wire. Referring to FIG. 3A, the moveable body 208 is spherical and configured to fit within channel defined by the stationary body 210. In FIG. 3B, an insert 302 is placed within channel defined by the stationary body 210. The radial extent of the insert may be less than the radial extent of the channel defined by the stationary body in which it is disposed. The insert 302 may comprise one or more socket elements 304. Correspondingly, the moveable body 208 may comprise one or more plug elements 306, which are configured to fit within these socket elements 304, in the closed position, to form a fluid tight seal. The open and closed configurations for each arrangement is shown.

Referring to FIG. 3B, the insert 302 may not be essential. For example, instead of the insert 302, the stationary body 210 may define one or more fluid channels, which act as the one or more socket elements 304. An advantage of using the insert is that fluid on the inlet-side may surround the inner channel wall of the stationary body, thereby acting as a coolant. This may help in dissipating heating from the cool and prevent overheating.

In the eICD 200, the moveable body 208 may be mounted on a landing arrangement 400. The landing arrangement 400 is configured to receive the moveable body 208 in the open position and allow for releasable detachment of the moveable body 208 such that it can transition to the closed position. The landing arrangement 400 therefore comprises a fastening means.

Referring to FIGS. 4A and 4B, the landing arrangement 400 may comprise one or pins 402 and the moveable body 208 may comprise one or more corresponding recesses 404 to receive these pins 402 in a mating connection. In the Figures, the inwardly facing surface of the moveable body is shown, as well as the side-profile of the landing arrangement. In some examples, the pins 402 and corresponding recesses 404 may be arcuate, or even circular in shape. Preferably, the landing arrangement 400 is rotationally symmetric such that any rotation of the moveable body 208 relative to the landing arrangement 400 does not affect the ability to form a secure mating connection. Equally, the landing arrangement 400 may instead comprise the recesses 404 and the inwardly facing surface of the moveable body comprises the pins 402. This example is not shown in FIGS. 4A and B. The landing arrangement 400, in turn, may be fitted securely into the eICD, for instance, using a permanent adhesive. Alternatively, the housing of the eICD 202 may comprise the landing arrangement 400 integrally formed therein.

Referring to FIG. 4C, the landing arrangement 400 comprises one or more biasing means such as springs 406. The moveable body 208 thereby being mounted on the one or more springs. In the closed position, the spring is extended from its equilibrium position, thereby producing a restoring force, which urges the moveable body 208 away from the stationary body 210. The arrow shown in FIG. 3C denotes the direction of this restoring force. In this way, after the power to the stationary body 210 is switched off, the moveable body 208 "springs" back into the open position automatically using the stored elastic energy. The stiffness of the spring can be judiciously chosen to ensure that this function occurs, as the skilled person would appreciate. At the same time, the inventors realise that using springs comes with a trade-off. On the one hand, it can produce more rapid switching, but on the other hand, the stationary body 210 needs to be stronger to maintain the eICD 200 in the closed state.

Equally, springs (or force restoring components) may not be required. For example, after the electromagnet 210 is switched off, the pressure difference between the inlet 204 and outlet 206, can force the moveable body 208 inwardly into the open position, and the continuous flow of fluid through the eICD 200 can maintain the moveable body 208 at its open position.

In some examples, the landing arrangement 400 is comprised from a tapering of the inner radially extending surfaces 408 of the eICD, as shown in FIG. 4D. Correspondingly, the moveable body 208 is also tapered to fit snugly within this tapered region of the eICD. The moveable body 208 may therefore be frustoconical in shape. Friction between the contact surfaces of the tapered walls and the edges of the moveable body thereby form a mechanical connection that opposes relative motion of the moveable body. The moveable body 208 may instead be a sphere. In such examples, the landing arrangement 400 may comprise a receiving cup or groove, integrally formed in the eICD housing, in which the moveable body 208 snugly fits. More generally, the landing arrangement 400 may be a profile, formed in the housing of the eICD, which allows the moveable body 208 to mate with the landing arrangement. The shape of the profile and the shape of the moveable body 208 are therefore complimentary. That is, the moveable body 208 fits snugly within the profile in the open position.

Figure 5A:
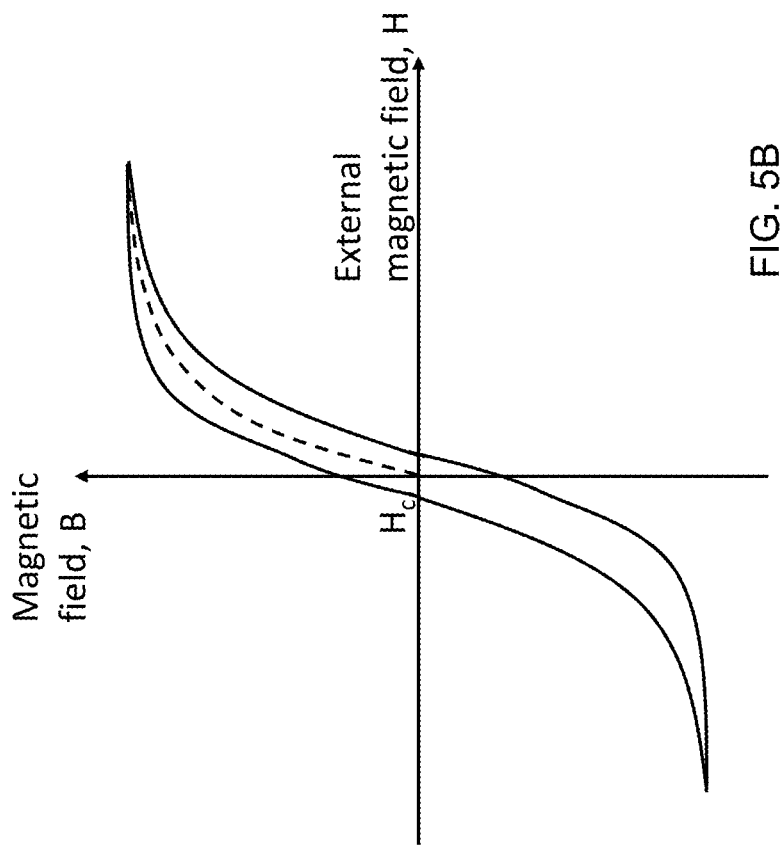
FIG. 5 is a schematic B-H plot.
Figure 5B:
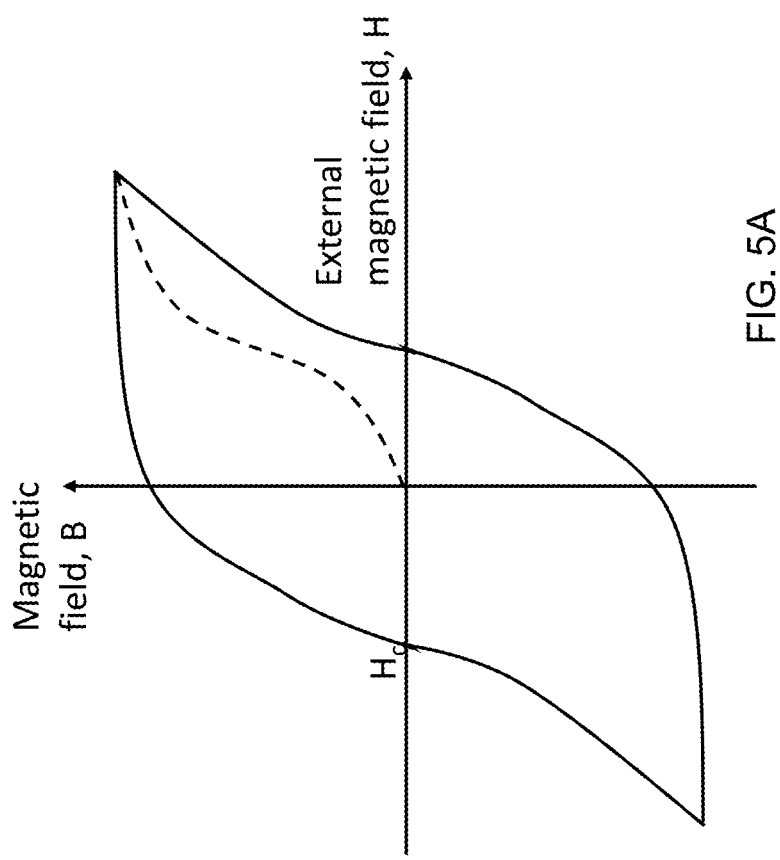

Once the electrical power to the stationary body 210 is switched off, the stationary body 210 ceases to be an electromagnet, and the magnetic field that it produced dissipates rapidly. The moveable body 208 may either be demagnetised or remain magnetised. The response of the moveable body 208 to the removal of the externally applied magnetic field depends on the material in which the moveable body comprises. The characteristics of which are illustrated in the shape of a hysteresis loop in a B-H plot. Typical plots for a hard and soft magnetic material are respectively shown in FIGS. 5A and B. As the skilled person would know, a magnetic material is not intrinsically "hard" or "soft", but can acquire these properties extrinsically via appropriate materials processing. If the moveable body 208 comprises a soft-magnetic material, which has little or no retentivity and/or coercivity, the moveable body 208 is demagnetised once the electromagnet 210 is switched off. That is, after the external magnetic field (H) is removed, the magnetisation within the moveable body 208 is effectively lost. The moveable body 208 remains magnetic, but it is not a magnet. Generally speaking, a magnet has a non-zero net magnetisation, whilst a magnetic material does not. Referring to FIG. 5B, the "B" field generated by the moveable body 208 in the absence of an external magnetic field (H) is negligible. If the moveable body 208 comprises a "hard-magnetic material", then it remains magnetised after the power to the stationary body 210 is switched off. A hard-magnetic material has appreciable retentivity and coercivity. That is, after the external magnetic field (H) is removed, the magnetisation within the material remains (which is known as the "retentivity"). The resulting "B" field, at no applied external field (H), is therefore large and non-zero. In such cases, the moveable body 208 becomes a permanent magnet. A hard-magnetic material can be demagnetised by applying an external magnetic field (H) in the opposite sense. The magnitude of field ($H_c$) required to demagnetise the magnet is known as the coercivity value. The moveable body 208 of the present invention may be comprise a hard or a soft magnetic material.

Possible magnetic materials include: iron, cobalt, nickel. Preferably, moveable body comprises a magnetic iron or nickel alloy. Magnetic iron alloys include any magnetic form of steel (i.e., comprising the ferrite phase). Iron-based alloys are cheap, but are more susceptible to corrosion. On the other hand, nickel alloys are more robust to corrosive environments but are more costly. In some examples, the iron or nickel alloy may comprise a polymer metal-matrix composite (PMMC). In a PMMC, particles of iron and/or nickel are dispersed within an electrically insulating polymer matrix. The particles may be either magnetically "soft or hard". The polymer serves two main functions. Firstly, they exhibit high ionic resistance and protect the metal particles dispersed within from corroding. Secondly, polymers are more compliant than conventional metal alloys and therefore may form a more robust fluid-tight seal. In addition, the inventors envisage that the fluid, flowing through the eICD 200, may comprise abrasive particles. These abrasive particles can cause erosion in mechanically soft materials. For this reason, parts of the eICD 200 in contact with the fluid may comprise the mechanically hard tungsten carbide, possibly as an outside layer. The PMMCs described above may be hardened by including tungsten carbide particles into the matrix.

Abrasive particles in the fluid may lead to rapid erosion rates within the eICD 200, especially with components that face the fluid direction. The erosion may be localised in this region. The inventors envisage that this might set the useful lifetime of these eICDs 200. In that respect, the flow directions shown in FIG. 2A, 2B, 6A, 6B, 9A, 9B can be reversed. That is, the inlet 210 may act instead as an outlet 206 and vice versa. In these configurations, fluid inflow acts tangentially to the surface of the moveable body 208 and localised erosion is less likely to occur. With flow over the surface of the moveable body 208, forces due to the Bernoulli effect may be large enough to cause lift. For this reason, such configurations may further comprise a landing arrangement to ensure that the moveable body 208 remains in the open position. Preferably, the lift generated by the Bernoulli effect is smaller than the force maintaining the moveable body 208 in the open position.

In other examples, the moveable body 208 may already be a permanent magnet. In these cases, the magnetic axis of the magnet 208 is aligned with the coil axis (i.e., the polarity of the electromagnet 210). If the moveable body 208 is a magnet, then the open and closed positions can be controlled by switching the polarity of the electromagnet 210. That is, by reversing the direction of the direct current in the spool/coil of wire. In the closed position, the stationary body 210 is configured to attract the moveable body 208, and in the open position, it is configured to repel the moveable body 208. Preferably, but not necessarily, the magnetic field (in the opposite sense) applied to the moveable body 208 (which is a magnet) is less than the coercive field ($H_c$) such that the moveable body 208 remains magnetised. Reversing the polarity of the electromagnet 210 to repel the moveable body 208 may reduce the time taken to switch the eICD 200 from a closed to an open state (and vice versa) because an additional external force is applied to open and close the eICD 200.

Referring to FIGS. 6A and B, the eICD 200 may further comprise a second electromagnet 602. The second electromagnet 602 may also comprise a spool or coil of wire, encapsulated by an electrically insulating material. The second electromagnet 602 may replace the landing arrangement 400. The eICD 200 therefore comprises a pair of electromagnets 210, 602. In the open position, a direct current is passed through the spool of wire in the second electromagnet 602 to switch it on to magnetically attract the moveable body 208 in the open position. The first electromagnet 210 is switched off. In the closed position, the second electromagnet 602 is switched off, and the first electromagnet 210 is switched on to attract the moveable body 208 to the first electromagnet 210, thereby forming the fluid-tight seal. In these examples, the moveable body 208 may be a magnet and/or comprise magnetic material. If the moveable body 208 is a magnetic material, the polarities of each electromagnet 210, 602 may be the same or different, as magnetic materials are not repelled in a magnetic field. If the moveable body 208 is a magnet, then the polarities of each electromagnet 210, 602 is the same. In a different example, each electromagnet 210, 602 is powered in the closed and the open state. In the closed state, the electromagnet 210 magnetically attracts the moveable body 208 and the second electromagnet 602 magnetically repels the moveable body 208. Conversely, in the open position, the opposite is true. In these examples, the polarity of each electromagnet 210, 608 is opposite. The second electromagnet 602 may further comprise a core material, disposed within the spool/coil of wire, which exhibits high magnetic permeability, in order to increase the magnetic field that the electromagnet 602 generates.

FIGS. 7A and B show another example of an eICD 200 in an open and closed state. In this configuration, the inlet 204 and outlet 206 are disposed on opposing sides of the housing 202. The inlet 204 and outlet 206 are disposed within the laterally extending surface of the housing 202. Accordingly, the path of fluid through the eICD 200 is different to that of the eICD 200 depicted in FIGS. 2A, 2B, 6A and 6B. The fluid flows in via the inlet, over the outwardly facing surface of the moveable body, around and beneath the moveable body 208, rather than simply over it. The fluid path is denoted in the figure with the arrows. The closing and opening principle of the eICD 200 is the same as described in detail above. In this example, the landing arrangement 400 may comprise a plurality of pins 402 or a plurality of springs 406. Each pin 402 is configured to fit inside a corresponding recess 404 in the inwardly facing surface of the moveable body. Preferably, the radial extent of each pin is larger than the depth of the corresponding recess, such that, when the moveable body 208 is in contact with the landing arrangement 400, there is a gap for fluid to flow around and beneath the moveable body 208 and out of the eICD 200 via the outlet 206. In the event that the pressure on the outlet-side exceeds that of the inlet-side, any induced flow in the opposite direction (opposing the arrows in the figure) urges the moveable body 208 into contact with the electromagnet 210, thereby preventing fluid flow. This arrangement therefore produces uni-directional flow.

FIGS. 8A and B show another example of an eICD 200 in an open and closed state. In this example, the channel defined by the stationary body 210 is not used for fluid flow. Instead, the channel defined by the stationary body 210 is filled with (or contains) a core 802. The core 802 comprises a material with a high magnetic permeability such as to increase the magnetic field generated by the electromagnet 210. In some examples, the core may be "T" shaped, so that in the closed position, the moveable body 208 is in contact with the core 802 (which exhibits magnified magnetic field) rather than directly to the encapsulation of the stationary body 210. In the eICD 200, fluid flows around the electromagnet 210 and through a channel defined by an aperture 804 in the moveable body 208, before exiting the outlet 206. The fluid path is denoted in the Figure with the arrows. In an example, the moveable body 208 is annular in shape. Annular may refer to a circular ring, or a rectangular ring. In other examples, the moveable body is a cuboid, or rectangular cuboid with one or more apertures 804. The full lateral extent of the moveable body (including the aperture) is substantially the same as the lateral extent of the eICD. In this way, the moveable body 208 forms a fluid tight seal along the radially extending walls of the eICD. A lubricant may be used along these walls within the eICD 200 to allow for this movement of the moveable body 208. If the moveable body 208 comprises a single aperture, then the lateral extent of that aperture 804 is less than the lateral extent of the stationary body 210 to ensure a fluid tight seal in the closed position. If the moveable body 208 comprises more than one aperture 804, then each aperture 804 is located within an area defined by projecting the lateral extent of the stationary body onto the moveable body 208 along the radial direction. Equivalently, when in the closed position, all the apertures 804 of the moveable body are located within the lateral extent of the stationary body 210 so that a fluid-tight seal is formed. Any of the landing arrangements 400 described above may be used.

The stationary body 210 may be secured to the "top" laterally extending surface of the housing by any means as can be envisaged by the skilled person. FIG. 8C illustrates the "top" side of the eICD comprising a plurality of inlets 204. Each inlet 204 is separated from another with a bridging member, formed out of the eICD housing 202. Each inlet 204 may be arcuate, circular, rectangular in shape, or any other shape, as would be appreciated by the skilled person. The central element shown in FIG. 8C provides a location for securement of the stationary body 210.

Referring to FIGS. 9A and B, another example of an eICD 200 in an open and closed state is shown. Comparing the example to the eICD 200 in FIG. 8, the outlet portion comprises a channel within the housing with a lateral extent and radial extent. The electromagnet may comprise a core. In the example shown, a T-shaped core is used. As the outlet 206 is no longer disposed immediately beneath the moveable body 208, the moveable body 208 does not require an aperture 804. The moveable body may be a planar disc or plate. As in FIG. 8, the lateral extent of the moveable body is substantially the same as the lateral extent of the eICD in order that a fluid tight seal is formed along the radially extending walls of the eICD 200. A lubricant may be used to allow movement of the moveable body 208. In the closed position, the moveable body 208 preferably does not cover the outlet entirely. In this way, any low-pressure region (i.e., the absence of fluid) generated when the moveable body 208 moves from the open position to the closed position may be filled with fluid from the outlet-side. This therefore minimises the pressure difference across the moveable body, because the region of very low pressure is removed, and accordingly, reduces the required strength of the electromagnet 210. The moveable body 208 may be controlled by magnetic means as described in detail above. Any of the landing arrangements 400 described above may be used.

As referred to above, the inlet 204 may also be disposed in one of the laterally extending surfaces of the eICD housing 202. In such examples, fluid inflow may pass over the surface of the moveable body 208. As is known, for example from WO2008/004875, flow over surfaces may generate lift in accordance with the Bernoulli effect. Preferably, in such arrangements, the lift generated by the Bernoulli effect is less than the force holding the moveable body 208 in the open position.

In another example, the moveable body 208 in the eICD 200 may be free floating. That is, the moveable body 208 may sit, unsecured, on a landing arrangement. According to the Bernoulli principle, the moveable body 208 may either be forced onto this landing arrangement, or urged away from it, as for example described in WO2008/004875, with the moveable body 208 in an open state. In that respect, the eICD 200 may be structurally similar to an AICD. However, a disadvantage of the AICD is that it is unable to fully close. This means that unwanted fluids, such as excess gas or water, can be reduced, but not eliminated altogether during production. An eICD 200 of this kind may operate substantially autonomously, but in addition, operative to fully close using the magnetic means described in detail above.

The housing of the eICD 202 may preferably, but not necessarily, be integrally formed with the wall of the base string. In other examples, the eICD 200 is a separate component, which is inserted into a hole or recess drilled into the wall of the base string. These arrangements are shown in FIGS. 10A and 10B respectively.

Whilst the inventors envisage primarily using the eICDs 200 in the producing section of a well, they may also find use in other areas of the well. For example, the eICDs may as water injectors in injector wells. When used as a water injector, the pressure differential across the eICD 200 in the closed state may be comparatively higher than with an inflow control device. The electromagnets 210, 602 may therefore require larger input currents.

As detailed above, a complete producing interval of the well may comprise one or more of the sections illustrated in FIGS. 10A and 10B. Each section shown may be connected to another section via, for example, threaded joints at either end. Each section comprises at least one eICD. In some examples, each section comprises more than one eICD and the plurality of eICDs are disposed with an angular spacing in the base string wall. In general, the spacing is equal to 360/n, where n is the number of eICDs in the section. In addition, each section of the producing interval of the well is in electrical connection so that electrical power can be supplied to the one or more eICDs 200 located on each section.

Referring to FIG. 11A, the electrical cabling 1102, 1104 may be run inside or outside of the base string 104. The cabling 1102, 1104 may comprise one or more cables for transporting current downhole and one or more other cables for transporting current out of the well. Alternatively, the cabling may comprise one or more coaxial cables, which are each capable of transporting current in both directions (downhole and out of the well). When running electrical cables 1104 along the outside of the base string, the electrical cables 1104 are susceptible to snagging and entangling during installation. On the other hand, running electrical cabling 1102 on the inside of the base string may affect flow in the base string 104 during operation. For this reason, in a preferred example, the electrical cabling 1106, 1108 is tubular in shape. The electrical cabling 1106, 1108 may be run on either on the inside or the outside of the base string 104. As the electrical cabling 1106, 1108 is tubular in shape, it is less susceptible to snagging and entanglement and does not affect flow characteristics within the base string 104. One or more holes in the tubular electrical cabling may be fabricated to ensure that fluid may still flow into the base string 104 during production. The cables 1102, 1104, 1106, 1108 transport an alternating current. The cables may also carry electrical signals via appropriate modulation of the current.

Referring now to FIGS. 11C and 11D, a cross-sectional view of the electrical cabling 1106, 1108 mounted on a base string 104 is shown. In FIG. 11C, the electrical cabling 1106, 1108 comprises three layers in a sandwich structure. The sandwich structure comprises two layers of electrically insulating material 1110, which surround an electrically conducting layer 1112. The electrically conducting layer 1112 may comprise copper. In an example, the layer 1112 comprises woven strands of copper to form a copper mesh. The electrically insulating layers 1112 ensure that the electrically conducting layer removes electrically isolated. The electrically insulating layer 1112 may, for example, comprise PTFE. In the sandwich structure, current may be transported downhole via the inner electrical cabling 1106 and out of the well via the electrical cabling 1108. An electrical connection between these two layers 1106, 1108 can be fabricated at the "toe" of the well.

In FIG. 11D, the electrical cabling 1106, 1108 comprises five layers in a double-stack sandwich structure. The double-stack sandwich structure comprises the sandwich structure of FIG. 11C, further comprising an additional electrically conducting 1112 and electrically insulating layer 1110 sequentially stacked. The electrical cabling 1106, 1108 shown in FIG. 11D, which comprises two electrically conducting layers 1112 is capable of carrying current in the downhole sense as well as out of the well. Therefore, for this type of electrical cabling 1106, 1108, it is not essential to have cabling on both sides of the base string 104.

Figure 12:
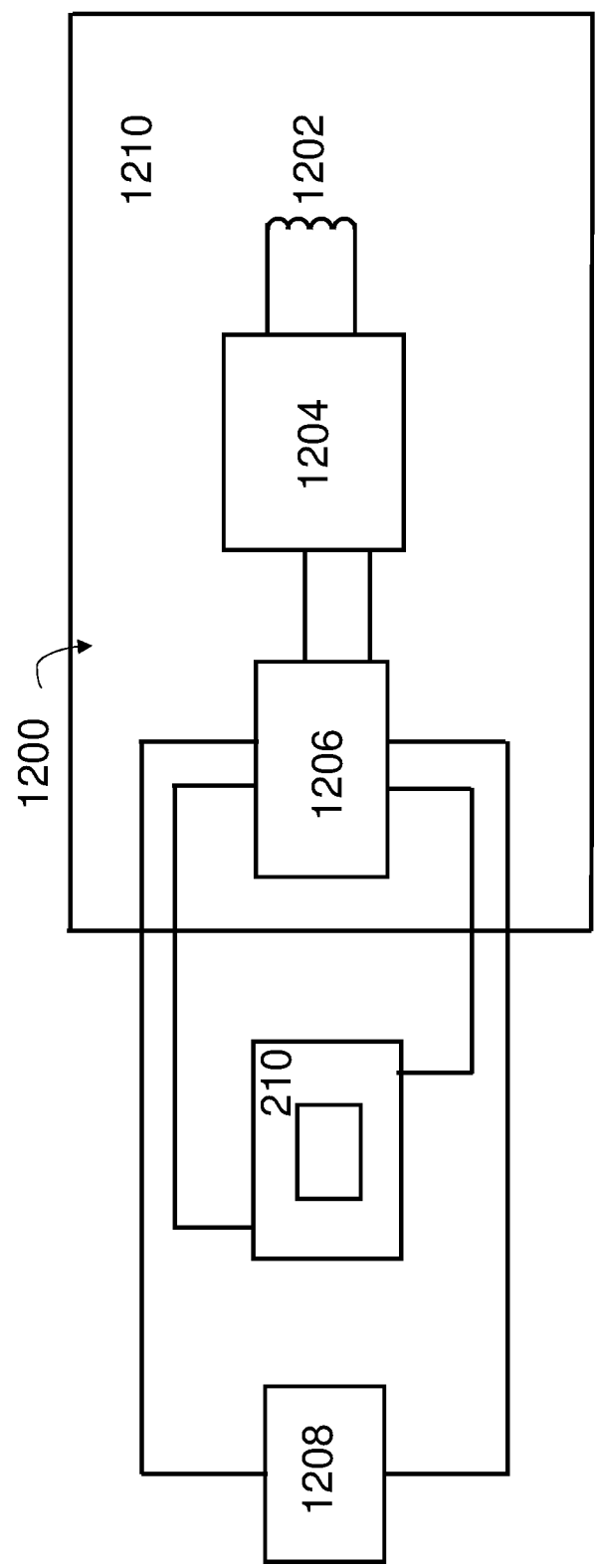
FIG. 12 is a schematic electrical circuit.

Each section of the well completion, as depicted in FIGS. 10A and B, comprises an electrical circuit which provides power to one or more electrical devices within the section. The electrical circuit may comprise a local energy storage unit (e.g., a battery). However, preferably, power is supplied to the section via the electrical cabling 1106, 1108 described above. One such electrical devices may be the stationary body 210 of the eICD 200. Other electrical devices include: pressure gauges, temperature gauges and flow-meters, water cut meters and gas detection meters. Referring now to FIG. 12, a schematic electrical circuit 1200 is shown. The electrical circuit 1200 comprises: a pick-up coil 1202 operative to generate an alternating current in the electrical circuit in a magnetic field; an a-c to d-c convertor 1204 configured to rectify the electrical signal; a computer chip 1206 comprising an electronic circuit; and one or more electrical devices 200, 1208 connected to the computer chip 1206. The electrical circuit 1200 may also comprise an amplifier. Generally speaking, the computer chip is configured with a microcomputer circuit board (a micro-controller and a microprocessor), memory and, optionally, an antenna for communication. The computer chip 1206, ac-to-dc convertor 1204 and the pick-up coil 1202 may be housed in an electrically insulating encapsulation 1210 to prevent electrical shorts from fluid ingress. One or more electrical connections may be made from the computer chip 1206 to the one or more electrical devices 1208, 210 via fluid-tight ports in the housing 1210.

The pick-up coil 1202 is located radially adjacent to the electrical cabling 1106, 1108 and oriented such that the coil axis of the pick-up coil 1202 is aligned in the circumferential direction (i.e., the magnetic field). For example, in the wall of the base string. As the cabling 1106, 1108 runs along the base string 104 and carries an alternating current, it generates an alternating magnetic field in the circumferential sense, which, in turn, can induce an alternating electromotive force (emf) in the pick-up coil 1202. The induced emf causes an alternating current to flow in the electrical circuit. In this way, electrical power can be transferred inductively from the electrical cabling 1106, 1108 to the electrical circuit 1200. In a different example, which is not illustrated, power can be delivered to the electrical circuit 1200 via direct electrical connection with the tubular electrical cabling 1106, 1108 or electrical cabling 1102, 1104. The power can then be used to control one or more devices connected to the computer chip 1206. If the section comprises more than one eICD 200, each eICD may be connected to a different computer-chip port.

As the computer chip 1206 and electrical devices 210, 1208 are powered using direct current, an ac to dc convertor 1204 can be used to convert the induced alternating current into a direct current. In some examples, the computer chip 1206 may include an ac to dc convertor 1204. The alternating magnetic field generated from the electrical cabling 1106, 1108 will introduce perturbations to the magnetic field generated by the stationary body 210. However, the magnitude of the latter magnetic field is much larger than the alternating magnetic field because the electromagnet 210 comprises many turns of wire and the radius of each coil in the electromagnet is small (on the order of a few mm). Conversely, the electrical cabling 1106, 1108 comprises only a single "turn" and the radius of that turn is equal to the radius of the base string (on the order of tens of cm). The alternating magnetic field is therefore not expected to be very large, or affect the position of the moveable body 208 in the eICD 200. If an electromagnetic core 802 is used in the electromagnet 210, the magnetic field will be increased even further. In a similar light, to prevent the base string 104 acting as a magnetic core to the electrical cabling 1106, 1108, the base string may comprise a non-magnetic material.

Furthermore, when the electrical cabling 1108 is disposed around the base string 104 it does not generate a magnetic field within the base string 104. In this configuration, magnetic interference is removed altogether. Accordingly, the pick-up coil 1202 is placed radially adjacent but outside the electrical cabling 1108 in order to "pick up" a magnetic field. As referred to above, this can be achieved by forming one or more holes in the electrical cabling 1108.

Depending on the modulation of the electrical signal, the computer chip 1206 determines whether to power on or off the corresponding computer-chip-ports that the electrical devices 1208, 210 are connected. Computer chips 1206, which comprise a microcontroller, are readily programmable and are considered "off the shelf" technology. Any known technique of signal modulation may be used to provide the computer chip 1206 instructions. The electrical signal is preferably modulated at the surface of the well. However, in other examples, one or more modulators and demodulators may be located downhole for this purpose. The signal may be transmitted via a communication protocol. In this way, each section comprising a computer chip 1206 may be independently controlled. Any known communication protocol may be used.

The computer chip 1206 may be configured to take readings from the one or more other electrical devices 1208 periodically. The computer chip 1206 may then transmit the signal to the surface via electrical cabling 1102, 1104, 1106, 1108. One or more amplifiers may be used to amplify the signal before coupling with the electrical cabling 1102, 1104, 1106, 1108. The signal may be coupled between the computer chip and electrical cabling 1102, 1104, 1106, 1108 by inductive means, using a coil similar to the pick up coil shown in FIG. 12. Preferably, the longitudinal axis of the electrical cabling 1102, 1104, 1106, 1108 and the axis of the coil are substantially aligned to maximise this coupling. In another example, the readings may be transmitted via an antenna on the computer chip 1206, which is able to modulate the readings into a signal. The signal may be transmitted as an electromagnetic carrier wave (e.g., a RF signal). The signal may then be relayed, via one or more transmitter and receiver elements within each section of the completion structure, to neighbouring sections and thereby to the surface. As power is supplied via the electrical cabling 1106, 1108, the transmitter and receivers may be directional. That is, the transmitters are operative to transmit RF signal out of the wellbore and the receivers are operative to receive RF signals downhole. One or more amplifiers may also be used. The transmitter and receivers may be located within a channel defined in the base string wall. In yet another example, optical fibres may be used to transmit the signal from the chip 1206 and the surface.

FIG. 13A shows a producing interval 1300 of a completed well located within a reservoir 102. The interval 1300 contains four zones. Each zone is separated by a swell packer 1302. The swell packers 1302 are configured to expand in the presence of reservoir fluid, thereby preventing fluid communication between neighbouring zones 1304. To some extent, the swell packers 1302 may also limit pressure communication between neighbouring zones 1304. Within each zone, there may be one or more sand screens 106. In turn, there may be one or more eICDs 200 for each sand screen 106. Each zone may comprise one or more sections of base string connected together. The joints, connecting each section, are not shown. Each zone is separated by a swell packer from the adjacent zone. There might be blank pipe sections included in a zone to separate the sand screen from the packers, or to separate multiple sand screens from one another.

In the example shown, the electrical cabling 1108 is disposed around the base string 104. Correspondingly, holes have been made in the electrical cabling 1108 to allow for placement of the sand screen 106; electrical devices 1208 and the pick-up coil 1202 for the electrical circuit 1200. The electrical devices 1208 and pick-up coil 1202 are located on the outside of the electrical cabling 1108. For clarity, FIG. 13B shows a magnified portion of the electrical circuit 1200, comprising the pick-up coil 1202, electrical device 1208 and the housing 1210. The magnified portion corresponds to one of the zones 1304 depicted in FIG. 13A (as denoted by the dot-and-dashed square). Electrical connections to the eICD 200 are not shown in FIG. 13B.

The electrical devices 1208, which are configured to measure one or more physical properties (e.g., temperature, pressure, flow-rate) may not necessarily be placed outside of the electrical cabling 1108. For example, the electrical devices 1208 may be placed within the connecting channel 1306 connecting the inlet of the eICD and the sand screen 106. The exact placement of each electrical device 1108 may generally depend on the parameter it measures.

In FIG. 13A, the zone 1304 comprises one section of base string. In the example shown, each zone/section 1304 comprises one sand screen 106, which allows fluid to flow from the reservoir into the base string 104 via the eICD 200. Generally, each zone 1304 or section may comprise one or more sand screens 106 and each sand screen may be connected to one or more eICDs 200. For example, there may be ten sand screens 106 per zone 1304 and each screen 106 may comprise three eICDs 200. As an eICD 200 may function as a choke and a valve, it can be used to control choking as well as prevent choking within each zone 1304. When an eICD 200 is connected to the sand screen 106, the total choking is determined by the combined choking effect of: the sand screen 106; the connecting channel 1306; the state of the eICD (i.e., open or closed); the dimensions of the eICD 200; the state of the eICD (i.e., open or closed); and the nozzle located at the outlet, or inlet of the eICD 200. As referred to above, the size and shape of the nozzle may be used to control the pressure drop (i.e., the choking effect). Each eICD 200 may have different sized nozzles to further improve choking possibilities. In the closed state, there is no choking effect, as fluid does not flow. When there are a plurality of eICDs 200 for a given screen, the total choking may therefore be more finely controlled. That is, with a single eICD 200 connected to a screen 106, the choking effect is either on or off (and to a fixed value), but with a plurality of eICDs 200, the magnitude of choking can be varied. For example, by varying the number of eICDs 200 in the open state. If there are a plurality of sand screens 106 per zone 1304, the degree of choking can also be controlled spatially within each zone 1304. This further improves control over choking. For example, closing a plurality of eICDs 200 within a zone 1304 may have the collective effect of choking production within that zone 1304. Choking is important because it is one route for improving the production efficiency and recovery.

The state of each eICD 200 in a given zone (i.e., open and closed) is controlled via the computer chip 1206 in the electrical circuit housing 1210. The electrical circuit 1200 is inductively coupled to the electrical cabling 1108 via the pick-up coil 1202 and therefore powered so long as the electrical cabling 1108 carries a current. As detailed above, the electrical cabling 1108 may also carry a modulated electrical signal, containing instructions for the computer chip 1206. Each electrical device 1208, 200 connected to the computer chip may therefore be controlled independently. For example, an electrical signal may instruct the computer chip 1206 to power the eICD 200 to switch state. Or, the electrical signal may instruct the computer chip 1206 to provide power to a pressure gauge to take a pressure measurement. These measurements may be relayed to the surface by means of an electromagnetic carrier wave (e.g., RF signal, electrical or optical), as detailed above. At the same time, different zones 1304 may also be controlled independently by appropriate modulation and/or an appropriate communication protocol. In summary, each zone 1304 of the producing interval 1300 of the well completion structure may be controlled independently via electrical input signals and each zone 1304 is operative to send measurements back to the surface via an electromagnetic carrier wave.

Accordingly, the producing interval 1300 of the well completion structure may therefore be considered a smart system 1300, as it is configured to send and receive signals. The smart system 1300 may be in any one of a plurality of configurational state. Each configurational state is defined by the state (i.e., open or closed) of all the eICDs 200. Generally speaking, the configurational state of the smart system 1300 determines the amount of choking within one region of the smart well 1300 compared to another and therefore it can be used to control the production of the well. The smart system may be controlled by a control device located on the surface. The control device is preferably automatic, but may allow for manual control. The control device may receive data from the one or more electrical devices 1208. The data received from these devices 1208 may be indicative of the real-time operating conditions in the smart well 1300 and the state of each eICD 200. For example, the state of the eICD 200 can be readily determined from a flow meter reading, or a pressure reading. As such, the control device can analyse the data to determine the state of each eICD 200 and the operating conditions of the smart well system 1300. The control device may then, via appropriate modelling, determine an updated configurational state of the smart well, which corresponds to an optimal pressure regime given the initial operating conditions. In the updated configurational state, some of the eICDs 200 may switch states and others may maintain their current states. To instruct the eICDs 200, the control device may generate control signals and transmit them downhole using electrical cabling 1102, 1104, 1106, 1108. In an example, the control device may determine, via appropriate modelling, how choking different zones 1304 of the smart system 1300 affects the pressure regime in the smart well 1300 and accordingly, determine a choking regime that corresponds to the optimal pressure regime. As described above, the control system may reduce or increase the choking effect by opening or closing eICDs 200 at different positions within the smart system 1300. In this way, the configurational state of the smart system 1300 can be controlled actively to improve production efficiency. The control system may be deterministic, or comprise an adaptive feedback loop whereby eICD settings are adaptively adjusted to reach a control target.

In the event of power loss, all the electromagnets 210 are switched off. Correspondingly, all the eICDs 200 are open (fail-safe open). This ensures that production can still occur. Equally, it is envisaged that the eICDs 200 could also close under loss of power. Referring back to the eICD 200 and landing arrangement 400 depicted in FIGS. 6A and B, a mechanical spring may be disposed on the inwardly facing surface of the moveable body 208 and connected to the upwardly facing surface of the eICD 200. The mechanical spring is in a state of compression when the eICD 200 is in the closed and open state. Accordingly, the spring always exerts a restoring force acting towards the electromagnet 210. When the power to both electromagnets 210, 602 is removed, the moveable body 208 is then urged into the closed position. In such cases, the electromagnet 602 is configured to maintain the moveable body 208 in the open position and a spring (or other resilient means) urges the moveable body 208 into the closed position once the power to the electromagnet is switched off (fail-safe close). The fail-safe option for each zone 1304 may be different. The choice of fail-safe option depends on the expected production of each reservoir zone. That is, during power failure, some zones 1304 keep producing production fluids, whilst others cease.

FIG. 14A shows a schematic illustration of an eICD smart well. The well comprises a production-tubing 1402 and a producing interval of the well 1300. The production tubing 1300 is disposed within a well casing 1404 and mounted on a landing profile. The landing profile ensures that the male part of an inductive coupler 1410 lands correctly onto a corresponding female part of the inductive coupler 1410, thereby allowing power transfer from between the production tubing 1402 and the producing interval of the well 1300. This landing profile and its implementation is well known in the prior art. In the example, the production tubing 1402 comprises a contraction joint 1406, which allows a tubing hanger to land into the wellhead and efficiently run the base string 104. The contraction joint is telescopic, which allows the tubing hanger to land in the wellhead and the otherwise stiff base string 104 to land in the inductive coupler 1410. As the base string 104 contains electrical cabling 1106, 1108, eICDs 200 and the electrical devices 1208 inbuilt, it can be installed much more rapidly than existing smart well technology, and it does not require an inner string. This has the advantage of simplifying the installation process, and in addition, reducing pressure loss from the well during completion.

One or more annular screen packers 1408 are used to isolate the producing region of the well 1300 from the production tubing 1402. The production tubing 1402 may also comprise equivalent electrical cabling, as depicted in FIGS. 11A and B. Conventionally, cabling is external to the production tubing 1402 and in the annulus defined by the casing 1404 and production tubing 1402, but in the present invention, tubular electrical cabling may also be adopted. At the landing profile, opposing end portions of the base string 104 and production tubing 1402 are coupled via an inductive coupler 1410 such that current and signals is transferred between the electrical cabling of the production tubing 1402 to the electrical cabling 1106, 1108 of the base string 104. To improve this coupling, the base string 104 and production tubing 1402 may overlap along the longitudinal direction. Referring to FIG. 14B, if the electrical cabling of the production tubing 1402 is tubular, then the entire production tubing 1402 and base string 104 can be run in together, which further improves installation efficiency. Accordingly, the contraction joint 1406 and inductive coupler 1410, as shown in FIG. 14A, are not necessary. In other examples, the electrical cabling may be run separately as external cabling; however, this requires more time to run and can lead to stability problems if the well is left open for too long. Optionally, the well may also comprise one or more annular production packers 1412 and a casing shoe 1414.

Many variations are possible within the scope of the invention, as will be clear to a skilled person.

The invention claimed is:

1. An inflow control device for use in a hydrocarbon producing well, the inflow control device being configured to switch between an open and a closed state, the inflow control device comprising:
    an inlet for fluid entry;
    an outlet for fluid exit;
    a housing;
    a first body and second body arranged within the housing, wherein the second body is moveable relative to the first body;
    a landing arrangement configured to receive the second body in an open position and permit releasable detachment of the second body such that the second body can transition to a closed position,
    wherein one of the landing arrangement and the second body comprises one or more protruding pins and the other one of the landing arrangement and the second comprises one or more corresponding recesses configured to receive said one or more pins in the open position, and an extent of each pin is larger than a depth of the corresponding recess such that, in the open position, there is a gap for fluid to flow around and beneath the second body,
    wherein in an electrically energised state, the first body is operative to magnetically attract or repel the second body,
    wherein, in the open state, the first and second body are located at respective open positions and define a continuous path with the housing, through which fluid can flow from the inlet to the outlet,
    wherein, in the closed state, the first and second body are located at respective closed positions and are contiguous, thereby blocking said continuous path, and
    wherein, the inflow control device is operative to switch between the open and closed states by electrically energising or de-energising the first body.

2. The inflow control device according to claim 1, wherein the first body comprises an electromagnet, the electromagnet comprising a coil of wire and being encapsulated in an electrically insulating layer.

3. The inflow control device according to claim 2, wherein the second body comprises a magnet and the magnetic axis of the second body is parallel with the coil axis.

4. The inflow control device according to claim 3, wherein the first body is operative to magnetically repel the second body.

5. The inflow control device according to claim 2, wherein the first body defines a channel along the coil axis and the continuous path comprises said channel and the width of the channel is less than the lateral extent of the second body, or, wherein the first body defines an annular channel around the coil axis, wherein the continuous path comprises the annular channel and the second body is arranged to seal the annular channel in the closed position.

6. The inflow control device according to claim 5, wherein the second body comprises one or more apertures and the continuous path comprises the one or more apertures.

7. The inflow control device according to claim 2, wherein the electromagnet comprises a core disposed within the coil of wire and the core is comprised from a soft magnetic material.

8. The inflow control device according to claim 1, wherein the second body comprises a magnetic material.

9. The inflow control device according to claim 1, wherein the shape of the first and second body are complimentary, or, wherein the contact surface defined between the first and second body is planar.

10. The inflow control device of claim 1, further comprising:
    a nozzle disposed at the outlet or the inlet.

11. The inflow control device according to claim 1, wherein the housing is comprised from a tubular wall, or wherein the first body is integrally formed with the housing.

12. A smart well divided into one or more zones by one or more packers, each zone comprising:
    a tubular configured to transport fluid;
    one or more screens;
    a connecting channel, defined within the wall of the tubular, configured to transport fluid from each screen to one or more of the inflow control device of claim 1, wherein there is pressure communication between the inlet of the inflow control device and the connecting channel and pressure communication between the outlet of the inflow control device and the tubular;
    one or more electrical conductors configured to transport electrical power into and out of each zone and transport signal into each zone;
    an electrical circuit coupled to the electrical conductors, wherein the electrical circuit is, at least partially, housed within the tubular walls, the electrical circuit comprising a computer chip; and
    a control device configured to control the state of each inflow control device, wherein the control device comprises one or more processors configured to generate computer-readable instructions for the corresponding computer chip, wherein, upon receiving the computer-readable instructions, said computer chip is operative to electrically energise or de-energise said inflow control device, thereby controlling a state thereof.

13. The smart well according to claim 12, wherein the one or more electrical conductors are tubular and said tubular electrical conductors are disposed around, or within the tubular.

14. The smart well according to claim 12, wherein the electrical circuit is inductively coupled to said electrical conductors.

15. The smart well according to claim 12, wherein the electrical circuit comprises one or more electrical devices configured to record data, the data comprising any one or more of: a temperature reading, a pressure reading a flow reading, a water content reading and a gas content reading, and comprising one or more of the following features:
   (i) wherein the computer chip transmits the recorded data via the one or more electrical conductors to the control device;
   (ii) wherein the control device is configured to analyse the data to determine the state of each inflow control device and the operating conditions;
   (iii) wherein neighbouring zones are joined at opposing ends; and
   (iv) wherein the control device is located at the surface.

16. A method for controlling the production of a hydrocarbon producing smart well according to claim 12, the method comprising:
   receiving, by a control device, data signals, from one or more electrical devices located in the smart well, for the smart well when the smart well is in a first configurational state, wherein the first configurational state is defined by a configurational state of the one or more inflow control devices;
   analysing, by the control device, the data signals to determine the state of the or each inflow control device and the operating conditions of the smart well;
   determining, by the control device, an updated state of the smart well corresponding to an updated pressure regime, wherein the updated state of the smart well is defined by an updated configurational state of the one or more inflow control devices; and
   transmitting control signals to the one or more inflow control devices of the hydrocarbon producing smart well, via electrical conductors, for the one or more inflow control devices to update their state according to the control signal.

17. The method according to claim 16, wherein the control device is provided at the surface.

18. A method of operating the inflow control device according to claim 1 between an open and a closed state, the method comprising electrically energising or de-energising the first body.

* * * * *